(12) United States Patent
Kikuchi et al.

(10) Patent No.: US 9,001,191 B2
(45) Date of Patent: Apr. 7, 2015

(54) CALIBRATION DEVICE, IMAGE DISPLAY SYSTEM AND SHUTTER GLASSES

(75) Inventors: Kazunori Kikuchi, Kanagawa (JP);
Takashi Tsurumoto, Saitama (JP);
Yoshinori Satoh, Saitama (JP)

(73) Assignee: Sony Corporation (JP)

( * ) Notice: Subject to any disclaimer, the term of this patent is extended or adjusted under 35 U.S.C. 154(b) by 571 days.

(21) Appl. No.: 13/065,535

(22) Filed: Mar. 24, 2011

(65) Prior Publication Data

US 2011/0242293 A1 Oct. 6, 2011

(30) Foreign Application Priority Data

Mar. 31, 2010 (JP) .............................. P2010-084112

(51) Int. Cl.
  *H04N 13/04* (2006.01)
  *G02B 27/22* (2006.01)
  *G09G 3/00* (2006.01)

(52) U.S. Cl.
  CPC ........ *G02B 27/2264* (2013.01); *H04N 13/0425* (2013.01); *H04N 13/0438* (2013.01); *G09G 3/003* (2013.01); *G09G 2310/08* (2013.01); *G09G 2360/145* (2013.01)

(58) Field of Classification Search
  USPC .......................................................... 348/51
  See application file for complete search history.

(56) References Cited

U.S. PATENT DOCUMENTS

| 6,914,561 B2 | 7/2005 | Kuroda et al. |
| 8,294,752 B2 * | 10/2012 | Mihara et al. ................... 348/53 |
| 2011/0012896 A1 * | 1/2011 | Ji ................................. 345/419 |

FOREIGN PATENT DOCUMENTS

| JP | 09-138384 A | 5/1997 |
| JP | 2000-036969 A | 2/2000 |
| JP | 2003-045343 A | 2/2003 |
| JP | 2003-304115 A | 10/2003 |

* cited by examiner

*Primary Examiner* — Anner Holder
(74) *Attorney, Agent, or Firm* — Lerner, David, Littenberg, Krumholz & Mentlik, LLP

(57) ABSTRACT

A calibration device including a communication section which communicates with a display device which displays images on a screen, a light sensor arranged in a position to receive transmitted light of a lens of shutter glasses, a signal processing section which processes an output signal of the light sensor, a processing section which determines a shutter opening/closing timing, and a shutter driving section which operates the opening and closing of shutters of shutter glasses in accordance with the shutter opening/closing timing determined by the processing section, where the communication section receives a standard pulse which shows a timing when images are switched from the display device, and the processing section determines an appropriate correction amount τ of the shutter opening/closing timing based on a change in the output of the light sensor when the shutter opening/closing timing is changed with regard to the standard pulse.

15 Claims, 19 Drawing Sheets

RIGHT EYE   LEFT EYE

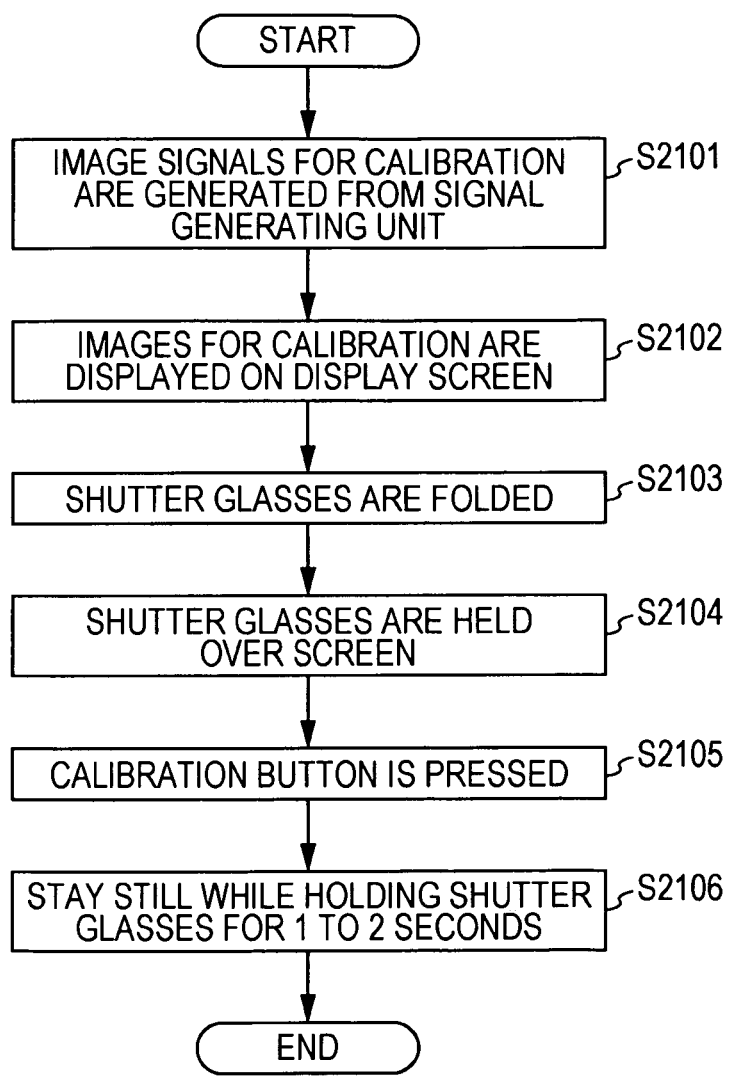

CALIBRATION DEVICE, IMAGE DISPLAY SYSTEM AND SHUTTER GLASSES

CROSS-REFERENCE TO RELATED APPLICATION

The present application claims priority from Japanese Patent Application No. JP 2010-084112 filed in the Japanese Patent Office on Mar. 31, 2010, the entire content of which is incorporated herein by reference.

BACKGROUND OF THE INVENTION

1. Field of the Invention

The present invention relates to an image display system, which is formed from a combination of a display device which displays a plurality of images, which are different from each other, in a time sharing manner and shutter glasses which a viewer of the images wears, and which show a stereoscopic image to the viewer by opening and closing the right and left shutters of the shutter glasses in synchronization with switching of images by the display device, and in particular to a calibration device which performs calibration of the timing of the opening and closing of the shutters of the shutter glasses with regard to the image switching of the display device, an image display system and shutter glasses.

2. Description of the Related Art

It is possible to show a stereoscopic image which is viewed in 3D by a viewer by displaying an image with parallax to the left and right eyes. As one method of showing a stereoscopic image, there is a method of having a user wear glasses with particular optical characteristics and showing an image with parallax to both eyes. For example, a time-sharing stereoscopic image display system is formed from a combination of a display device which displays a plurality of images, which are different from each other, in a time sharing manner and shutter glasses which a viewer of the images wears. The display device displays a left-eye image and a right-eye image alternatively on a screen with an extremely short cycle, and at the same time, provides images to a left eye and a right eye in synchronization with the cycle of the left-eye image and the right-eye image separately. On the other hand, the shutter glasses which the viewer wears transmit light to a left-eye portion of the shutter glasses and block light to a right-eye portion in a case where the left-eye image is being displayed, and transmit light to the right-eye portion of the shutter glasses and block light to the left-eye portion in a case where the right-eye image is being displayed (for example, Japanese Unexamined Patent Application Publication Nos. 9-138384, 2000-36969, and 2003-45343).

In the time-sharing stereoscopic image display system, when the left-eye image and the right-eye image are displayed in a time sharing manner, there is one technical problem in separating the left-eye image and the right-eye image so that crosstalk is not generated. For example, a stereoscopic image display method is proposed which suppresses flicker due to residual images by setting a simultaneous light-blocking state where the left-eye shutter and the right-eye shutter are simultaneously in a light-blocking state to a portion of each frame period due to a period when the left-eye shutter and the right-eye shutter are both switched to the light-blocking state being set to be an earlier period than a period when the frame period is switched (for example, Japanese Unexamined Patent Application Publication No. 2003-304115).

In the time-sharing image display system, typically, the display device generates a standard pulse in synchronization with the switching of the left-eye image and the right-eye image, and notifies the shutter glasses of the timing of the opening and closing of the shutters based on the standard pulse. Then, in the shutter glasses, the left and right shutters are alternatively operated to open and close based on a notified timing of the opening and closing of the shutters signal. In most cases, communication between the display device and the shutter glasses is one-way communication from the display device to the shutter glasses using infrared communication.

In the display device, a delay time is generated from when an image signal is switched (that is, from when the standard pulse is generated) to when the display on a screen is visually switched. The delay time is a phase difference of the timing of the image switching and the timing of the opening and closing of the shutters of the shutter glasses and is a cause of crosstalk. As one method of resolving the phase difference, calibration of the timing of the opening and closing of the shutters may be performed in the shutter glasses with regard to the standard pulse.

SUMMARY OF THE INVENTION

It is desirable to provide a superior calibration device, which is capable of appropriately performing calibration of the timing of the opening and closing of the shutters of the shutter glasses with regard to the image switching at the display device, an image display system, and shutter glasses.

According to a first embodiment of the invention, a calibration device is provided with a communication section which communicates with a display device which displays images on a screen, a light sensor arranged in a position to receive transmitted light of a lens of shutter glasses, a signal processing section which processes the output signal of the light sensor, a processing section which determines a timing of opening and closing of shutters, and a shutter driving section which operates the opening and closing of shutters of shutter glasses in accordance with the timing of the opening and closing of shutters determined by the processing section, where the communication section receives a standard pulse which shows a timing when images are switched from the display device, and the processing section determines an appropriate correction amount $\tau$ of the timing of the opening and closing of shutters based on a change in the output of the light sensor when the timing of the opening and closing of shutters is changed with regard to the standard pulse.

According to a second embodiment of the invention, the calibration device of the first embodiment is configured so that, when the display device alternatively switches between a white display and a black display for each frame, the processing section determines an appropriate correction amount of the timing of the opening and closing of shutters based on a $\tau$–t curve obtained by the lens transmitting display light in a period where a display period of the white screen and an opening period of shutters overlaps, and an output pulse width t which is output from the light sensor being measured while changing the correction amount $\tau$ of the timing of the opening and closing of shutters with regard to the standard pulse.

According to a third embodiment of the invention, the light sensor of the calibration device of the second embodiment is arranged in a position to receive transmitted light of a right-eye lens of the shutter glasses. Then, when the display device alternatively switches between the white display as a left-eye image and the black display as a right-eye image for each frame, in terms of the $\tau$–t curve, a correction amount $\tau A$ of a time A when the output pulse width t becomes t=0 from t>0 and a correction amount $\tau B$ of a time B when the output pulse width t becomes t>0 from t=0 are obtained, and based on a time P which is the center between the time A and the time B, a timing correction amount $\tau P$ $(=(\tau B-\tau A)/2)$ of a right-eye shutter and a timing correction amount $\tau Q$ of a left-eye shutter at a time Q, which is a phase reversal of only 180 degrees from the timing correction amount $\tau P$ $(=(\tau B-\tau A)/2)$ of the right-eye shutter, are determined.

According to a fourth embodiment of the invention, the processing section of the calibration device of the third embodiment is configured to obtain the correction amount $\tau B$ of the time B when the output pulse width t becomes t>0 from t=0 in a state where the shutter glasses are positioned in an upper screen portion of the display device and obtains the correction amount $\tau A$ of the time A when the output pulse width t becomes t=0 from t>0 in a state where the shutter glasses are positioned in a lower screen portion of the display device.

According to a fifth embodiment of the invention, an image display system is configured by shutter glasses provided with a shutter for each lens, a light sensor arranged in a position to receive transmitted light of at least one lens, a first communication section, and a control section which controls driving of the shutters, and a display device provided with a display section, a signal generating unit which generates an image signal displayed in the display section, and a second communication section, where the display device switches and displays images for each lens in a time sharing manner, and sends a standard pulse which shows a timing of the switching of the images from the second communication section, and the control section of the shutter glasses determines an appropriate correction amount $\tau$ of the timing of the opening and closing of the shutters for each lens based on a change in the output of the light sensor when the timing of the opening and closing of the shutters is changed with regard to the standard pulse received by the first communication section.

However, the "system" referred to here is a logical composite of a plurality of devices (or functional modules which realize particular functions) and whether or not the devices or the functional modules are in the same casing is not relevant.

According to a sixth embodiment of the invention, the image display system of the fifth embodiment is configured so that the shutter glasses send information relating to the determined correction amount $\tau$ from the first communication section to the display device, and the display device receives and stores the information relating to the correction amount $\tau$ sent from the shutter glasses using the second communication section.

According to a seventh embodiment of the invention, the image display system of the sixth embodiment is configured so that the display device sends the information relating to the stored correction amount $\tau$ from the second communication section to the shutter glasses.

According to an eighth embodiment of the invention, the image display system of the sixth embodiment is configured so that the display device sends the standard pulse after being corrected using the correction amount $\tau$.

According to a ninth embodiment of the invention, shutter glasses are equipped with a lens, a shutter attached for each lens, a rim supporting the lens, a temple attached to the rim so as to be foldable, a light sensor arranged at an inner side of at least one temple in a folded state so as to receive transmitted light of at least one lens, a signal processing section which processes an output signal from the light sensor, a communication section which communicates with a display device which displays images on a screen, a processing section which determines a timing of opening and closing of the shutters, and a shutter driving section which operates the shutters of the shutter glasses to open and close in accordance with the timing of the opening and closing of the shutters determined by the processing section.

According to a tenth embodiment of the invention, the communication section of the shutter glasses of the ninth embodiment receives a standard pulse which shows a timing of the image switching from the display device. Then, while the temple is folded and the light sensor receives transmitted light of at least one lens, the processing device is configured to determine an appropriate correction amount $\tau$ of the timing of the opening and closing of the shutters based on a change in the output of the light sensor when the timing of the opening and closing of the shutters is changed with regard to the standard pulse.

According to an eleventh embodiment of the invention, the shutter glasses of the tenth embodiment are configured so as to send information relating to the determined correction amount $\tau$ from the communication section to the display device.

According to the invention, it is possible to provide a superior calibration device, which is capable of appropriately performing calibration of the timing of the opening and closing of the shutters of the shutter glasses with regard to the image switching at the display device, an image display system, and shutter glasses are provided.

According to the first, fifth, ninth, and tenth embodiments of the invention, it is possible to determine an appropriate correction amount $\tau$ of the timing of the opening and closing of the shutters based on a change in the output of the light sensor when the timing of the opening and closing of the shutters is changed with regard to the standard pulse using the light sensor arranged in a position to receive transmitted light of the lens of the shutter glasses.

According to the second embodiment of the invention, it is possible to determine an appropriate correction amount of the timing of the opening and closing of the shutters based on a change in the output pulse width t of the light sensor while alternatively switching between a white display and a black display for each frame in the display device and changing the correction amount $\tau$ of the timing of the opening and closing of the shutters with regard to the standard pulse.

According to the third embodiment of the invention, based on the time P which is the center between the time A when the output pulse width t, which is from the light sensor arranged in a position to receive transmitted light of the right-eye lens, becomes t=0 from t>0 and the time B when t>0 from t=0, it is possible to determine the timing correction amount $\tau P$ $(=(\tau B-\tau A)/2)$ of the right-eye shutter and to determine the timing correction amount $\tau Q$ of the left-eye shutter at the time Q which is a phase reversal of only 180 degrees from the timing correction amount $\tau Q$.

According to the fourth embodiment of the invention, even in a case where the display device which is the target of calibration has a large screen, by obtaining the correction amount $\tau B$ of the time B when the output pulse width t becomes t>0 from t=0 in the state where shutter glasses are positioned in an upper screen portion and the correction amount $\tau A$ of the time A when the output pulse width t becomes t=0 from t>0 in the state where the shutter glasses are arranged in a lower screen portion, it is possible to obtain the correction amount $\tau A$ of the time A when the output pulse width t becomes t=0 from t>0 in a state where the shutter glasses are more accurately positioned in the lower screen portion and to more accurately determine the timing correction amount $\tau P$ $(=(\tau B-\tau A)/2)$ of the right-eye shutter.

According to the sixth to eighth and the eleventh embodiments of the invention, since it is possible for the correction amount τ of the timing of the opening and closing of the shutters obtained by executing calibration in the shutter glasses to be held at the display device, it is possible for the correction amount τ to be used in common at a plurality of shutter glasses which use the same display device and for it not to be necessary that calibration is performed for each of the shutter glasses.

According to the eighth embodiment of the invention, since the display device sends the standard pulse which has been corrected by the correction amount τ to the shutter glasses, it is completely not necessary for each of the shutter glasses, which use the display device where calibration has been performed once, to take into consideration the phase difference of the timing of the image switching with regard to the standard pulse.

According to the ninth and tenth embodiments of the invention, when calibration of the timing of the opening and closing of the shutters is performed, it is sufficient for a user to perform an operation of holding the shutter glasses where the left and right temples have been folded over the screen of the display device which displays images for calibration.

Further aims, characteristics and advantages of the invention will be made clear by a more detailed description based on the embodiment of the invention and the attached diagrams described later.

BRIEF DESCRIPTION OF THE DRAWINGS

FIG. 21 is a flow chart illustrating an operation sequence of a user when calibration of the timing of the opening and closing of the shutters is performed.

DESCRIPTION OF THE PREFERRED EMBODIMENTS

Below, the details of the embodiment of the invention will be described while referring to the diagrams.

Figure 1:
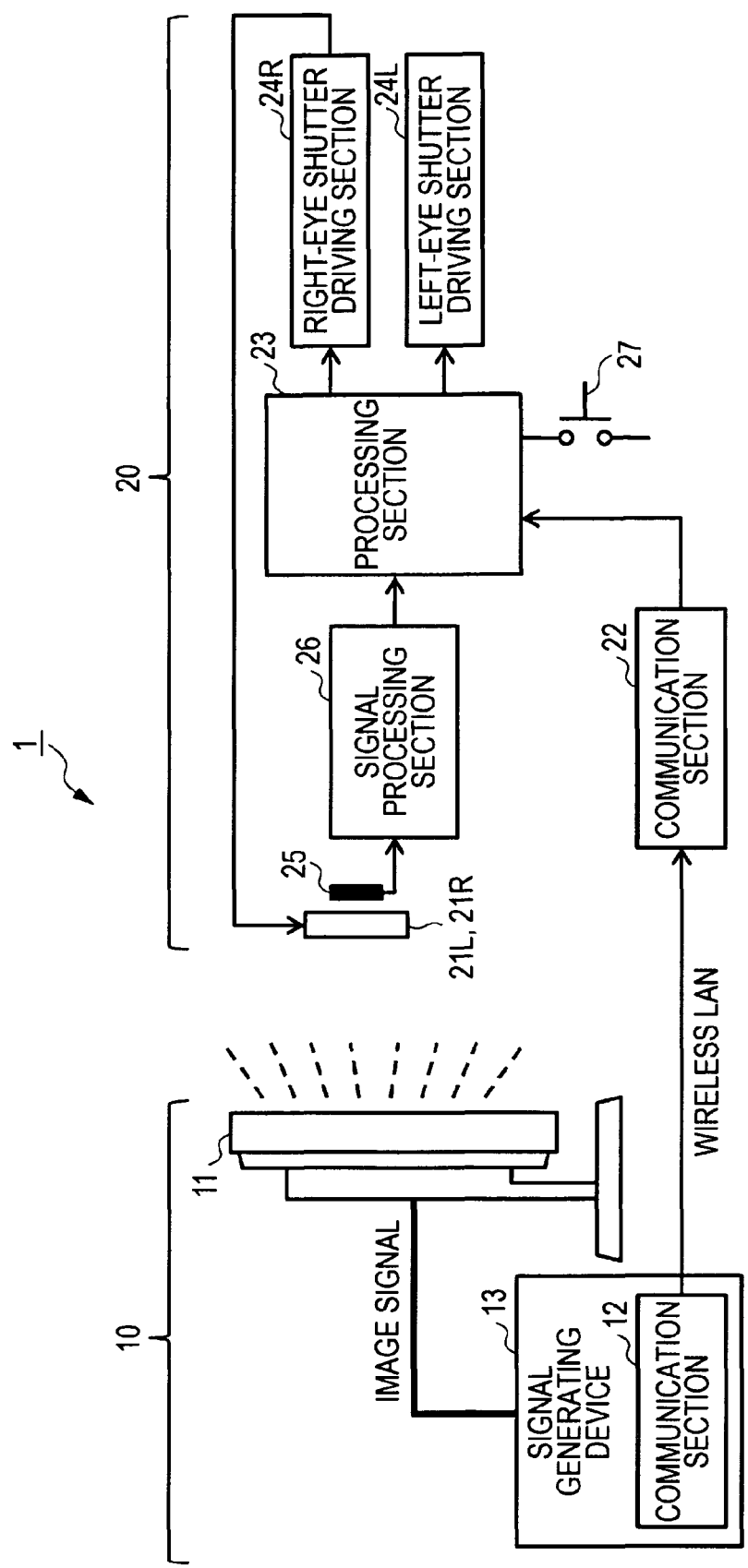
FIG. 1 is a diagram schematically illustrating a configuration of a stereoscopic image display system according to an embodiment of the invention.

In FIG. 1, a configuration of a stereoscopic image display system 1 according to an embodiment of the invention is schematically shown. The stereoscopic image display system 1 shown in the diagram is configured by a display device 10 and shutter glasses 20 which a viewer wears. The display device 10 switches and displays a plurality of images which are different from each other such as a left-eye image and a right-eye image in a time sharing manner. At the same time, the shutter glasses 20 operate shutters provided at left and right lenses to open and close in synchronization with the image switching of the display device 10 and separate the left-eye image and the right-eye image.

The display device 10 is provided with a display section 11 which performs image display, a communication section 12 which performs data communication with the shutter glasses 20, and a signal generation unit 13 which generates image signals. The display section 11 and the signal generating unit 13 are connected by, for example, an HDMI (High-Definition Multimedia Interface) image signal interface, and the signal generating unit 13 supplies image signals to the display section 11. When displaying stereoscopic images, the signal generating section 13 alternatively outputs a left-eye image L and a right-eye image signal R and performs image switching in the display section 11.

The shutter glasses 20 is provided with shutters 21R and 21L which are respectively attached to the left and right lenses, a communication section 22 which performs data communication with the display device 10, a processing section 23 which processes data received by the communication section 22, a right-eye shutter driving section 24R and a left-eye shutter driving section 24L which are operated to open and close the shutters 21R and 21L which are respectively attached to the left and right lenses, a light sensor 25 arranged in the vicinity of the right-eye lens, and a signal processing section 26 which processes output signals from the light sensor 25. The light sensor 25 and the signal processing section 26 are used in calibration of the timing of the opening and closing of the shutters, but the details on this will be described later.

In the display device 10, the signal generating unit 13 generates a standard pulse in synchronization with the switching of the left-eye image L and the right-eye image signal R and the standard pulse is sent from the communication section 12 to the shutter glasses 20. In the shutter glasses 20, the processing section 23 operates the left and right shutters 21L and 21R to open and close via the left-eye shutter driving section 24L and the right-eye shutter driving section 24R based on the standard pulse received by the communication section 22.

Figure 2:
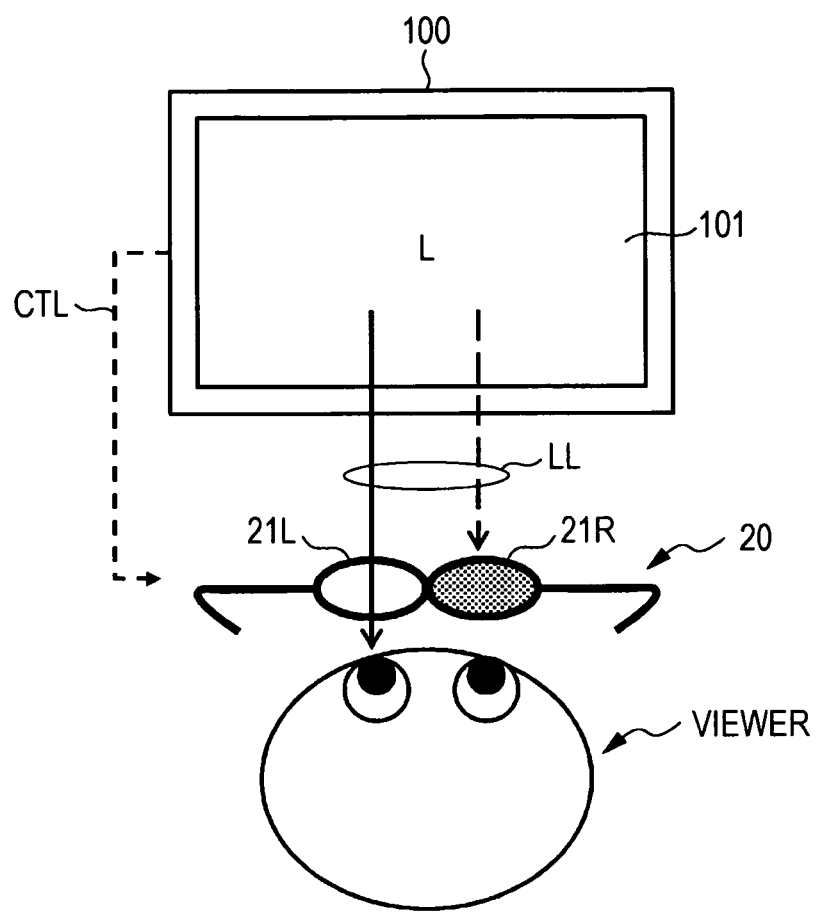
FIG. 2 is a diagram illustrating a control operation of shutter glasses in an L sub-frame period.
Figure 3:
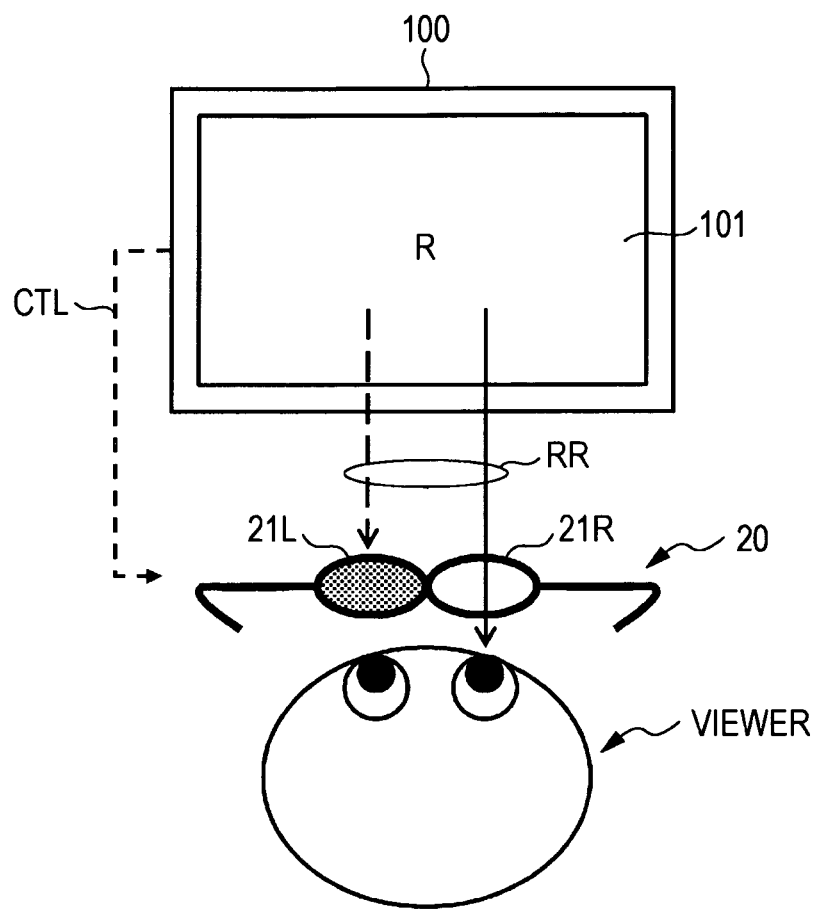
FIG. 3 is a diagram illustrating a control operation of the shutter glasses in an R sub-frame period.

In FIG. 2, a control operation of the shutter glasses 20 in an L sub-frame period is shown. As shown in the diagram, in the L sub-frame period, the left-eye shutter 21L is set to be in an open state and the right-eye shutter 21R is set to be in a closed state based on the standard pulse, and only display light LL based on the left-eye image L is transmitted through the left-eye lens. In addition, in FIG. 3, a control operation of the shutter glasses 20 in an R sub-frame period is shown. As shown in the diagram, in the R sub-frame period, the right-eye shutter 21R is set to be in an open state and the left-eye shutter 21L is set to be in a closed state based on the standard pulse, and only display light RR based on the right-eye image R is transmitted through the right-eye lens.

Data communication between the display device 10 and the shutter glasses 20 is performed between the communication section 12 and the communication section 22. In the embodiment, it is assumed that the shutter glasses 20 are cordless. In the embodiment, as a wireless communication means between the communication section 12 and the communication section 22, a wireless network such as IEEE802.15.4 is used.

Since the power consumption of the wireless network is high, the demand for power is excessive if the shutter glasses 20 are normally waiting for reception of a notification of the timing of the opening and closing of the shutters from the display device 10. With regard to this, by obtaining synchronization of a clock frequency between the shutter glasses 20 and the display device 10 and matching counter values using the opening and closing of the shutters, it is sufficient for the notification of the timing of the opening and closing and parameters to be intermittently performed from the display device 10 to the shutter glasses 20. That is, it is not necessary for the shutter glasses 20 to be normally waiting for reception even when stereoscopic images are being displayed and it is possible to reduce power consumption. An image display system which uses a wireless network is disclosed in Japanese Unexamined Patent Application Publication No. 2009-276948 which has already been released by the present applicants.

In the system configuration example shown in FIG. 1, the display device 10 and the shutter glasses 20 perform communication one-to-one, but it is possible for the communication section 12 of the display device 10 to operate as an access point and include a plurality of shutter glasses each of which operates as a terminal. The wireless network is two-way communication, and it is possible to perform data communication from the shutter glasses 20 to the display device 10 and the service which the system 1 is able to provide is expanded.

In the display device 10, a delay time is generated from when an image signal is switched in the signal generating unit 13 (that is, from when the standard pulse is generated) to when the display on the display section 11 is visually switched. The delay time is phase difference of the timing of the image switching and the timing of the opening and closing of the shutters 21L and 21R of the shutter glasses 20 and is a cause of crosstalk.

When a long simultaneous light-blocking period, where the left-eye shutter 21L and the right-eye shutter 21R are simultaneous in a light-blocking state, is taken, it is possible to avoid crosstalk caused by the phase difference. However, the opening period is shortened and the image viewed by the viewer becomes dark. As such, in order to avoid crosstalk caused by the phase difference, calibration of the timing of the opening and closing of the shutter with regard to the standard pulse is necessary.

In the embodiment, in the display device 10, images of black, white, black, white, black, . . . are displayed for each frame in the display section 11, and in the shutter glasses 20, the output of the light sensor 25 attached to the right-eye lens is measured while a correction amount of the timing of the opening and closing of the shutters is changed and calibration is performed based on the results.

For example, when a calibration button 27 of the shutter glasses 20 is pressed, the process moves to a calibration mode. In the calibration mode, in the shutter glasses 20, measurement of the amount of light received by the light sensor 25 is started. In addition, the starting of calibration is reported from the shutter glasses 20 to the display device 10 via the communication section 22 and 12. In response to this, the display device 10 displays images of black, white, black, white, black, . . . are displayed for each frame in the display section 11.

The display device 10 notifies the standard pulse, which is synchronized with the switching of the white and black images in the display section 11, from the communication section 12. Below, the left-eye image is set to white and the right-eye image is set to black. On the other hand, in the shutter glasses 20, the left and right shutters 21L and 21R are operated to open and close based on the standard pulse using the left-eye shutter driving section 24L and the right-eye shutter driving section 24R.

When the phase difference is within a permitted range, and white which is the left-eye image is displayed in the display section 11 but the right-eye shutter 21R is open or when the left-eye shutter 21L is open but black which is the right-eye image is displayed in the display section 11, the output of the light sensor 25 is in a non-output state (inactive). In other words, when the phase difference exceeds the permitted range, white which is the left-eye image is displayed in the display section 11, and the right-eye shutter 21R is open, the output of the light sensor 25 is in an output state (active).

Figure 4:
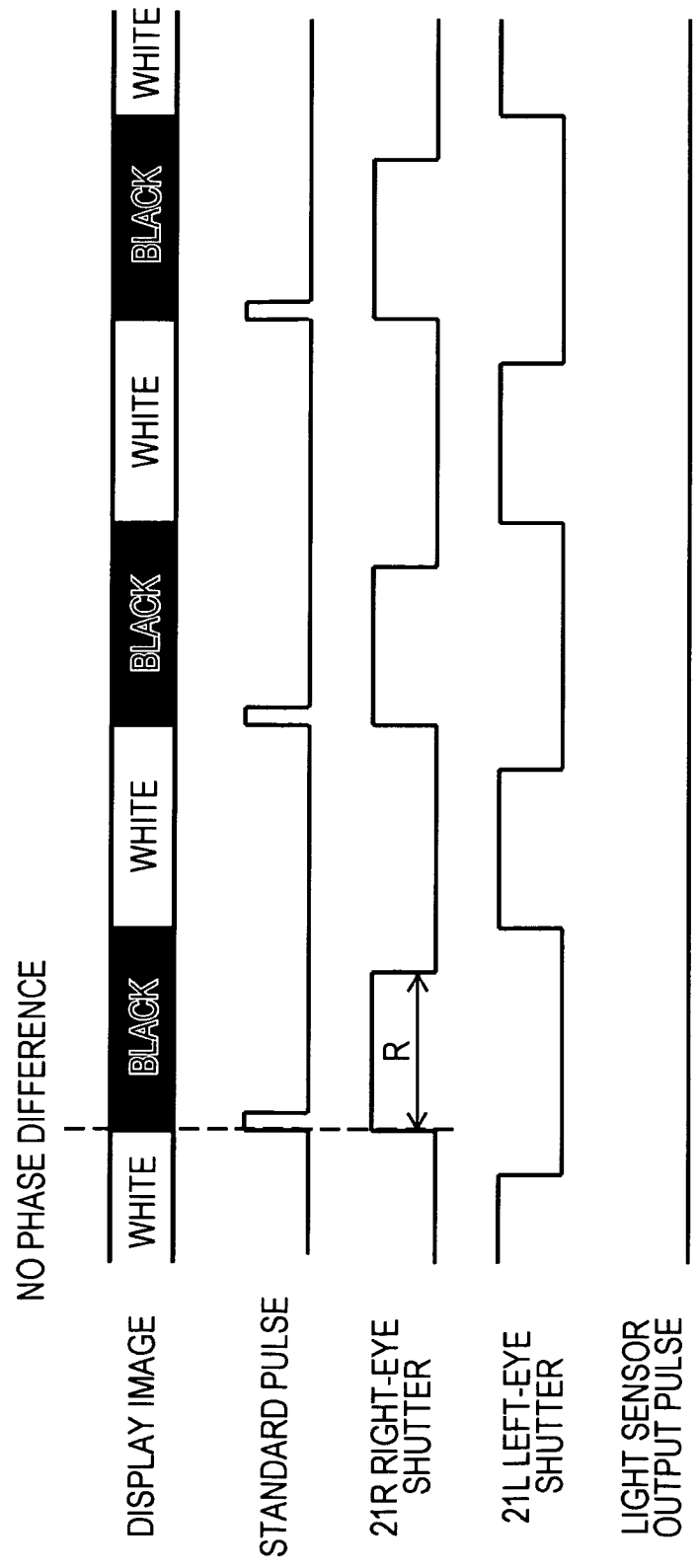
FIG. 4 is a diagram illustrating a timing chart of each section in a case where there is no phase difference between a standard pulse and a timing of image switching in a display section.

In FIG. 4, a timing chart of each section is shown in a case where there is no phase difference between the standard pulse and the timing of the image switching in the display section 11.

The display device 10 sends the standard pulse showing the timing when the white image is switched to the black image from the communication section 12. In accordance with the standard pulse received from the display device 10, the shutter glasses 20 open the right-eye shutter 21R for only a predetermined opening period R in line with the start timing of the display period of the right-eye image and open the left-eye shutter 21L for only a predetermined opening period R in line with the start timing of the display period of the left-eye image. Since the left-eye image is white and the right-eye image is black, the viewer wearing the shutter glasses 20 views the white image in the left eye and the black image in the right eye, and crosstalk is not generated. Accordingly, when the transmitted light of the right-eye lens is measured using the light sensor 25, the output (the result of measuring the output of the light sensor 25 using the signal processing section 26) is a non-output state.

Figure 5:
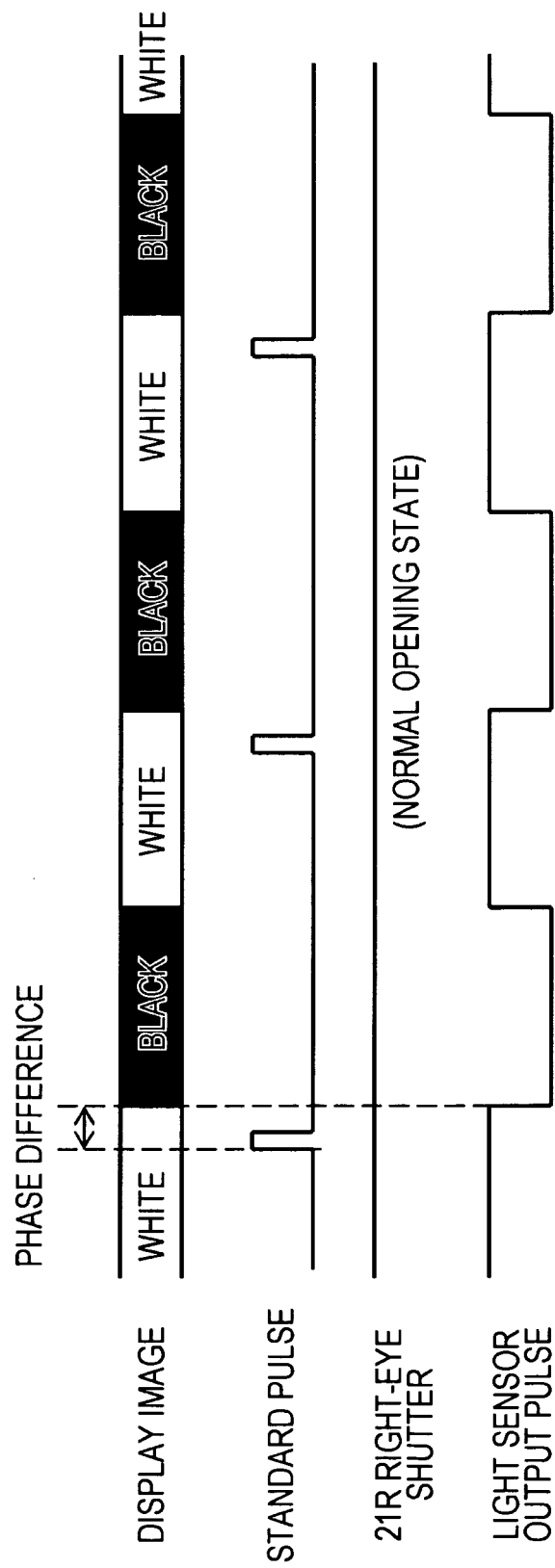
FIG. 5 is a diagram illustrating a timing chart of each section when a right-eye shutter is made to be in a normal opening state by the shutter glasses in a state where there is phase difference between the standard pulse and the timing of image switching in the display section.

Here, the phase difference between the standard pulse generated in the display device 10 and the image switching in the display section 11 and the phase difference between the standard pulse generated in the display device 10 and the timing of the opening and closing of the shutters in the shutter glasses 20 are assumed to be generated. In FIG. 5, a timing chart of each section is shown when the right-eye shutter 21R is made to be in a normal opening state by the shutter glasses 20 in a state where there is phase difference between the standard pulse and the timing of the image switching in the display section 11.

When black which is the right-eye image is being output and displayed in the display section 11, the output signal of the light sensor 25 is in a non-output state. When white which is the left-eye image is being output and displayed in the display section 11, the output signal of the light sensor 25 changes to an output state. After being digitally converted using the signal processing section 26, the output signal of the light sensor 25 is input to the processing section 23. The output signal of the light sensor 25 has phase difference with regard to the standard pulse.

Figure 6:
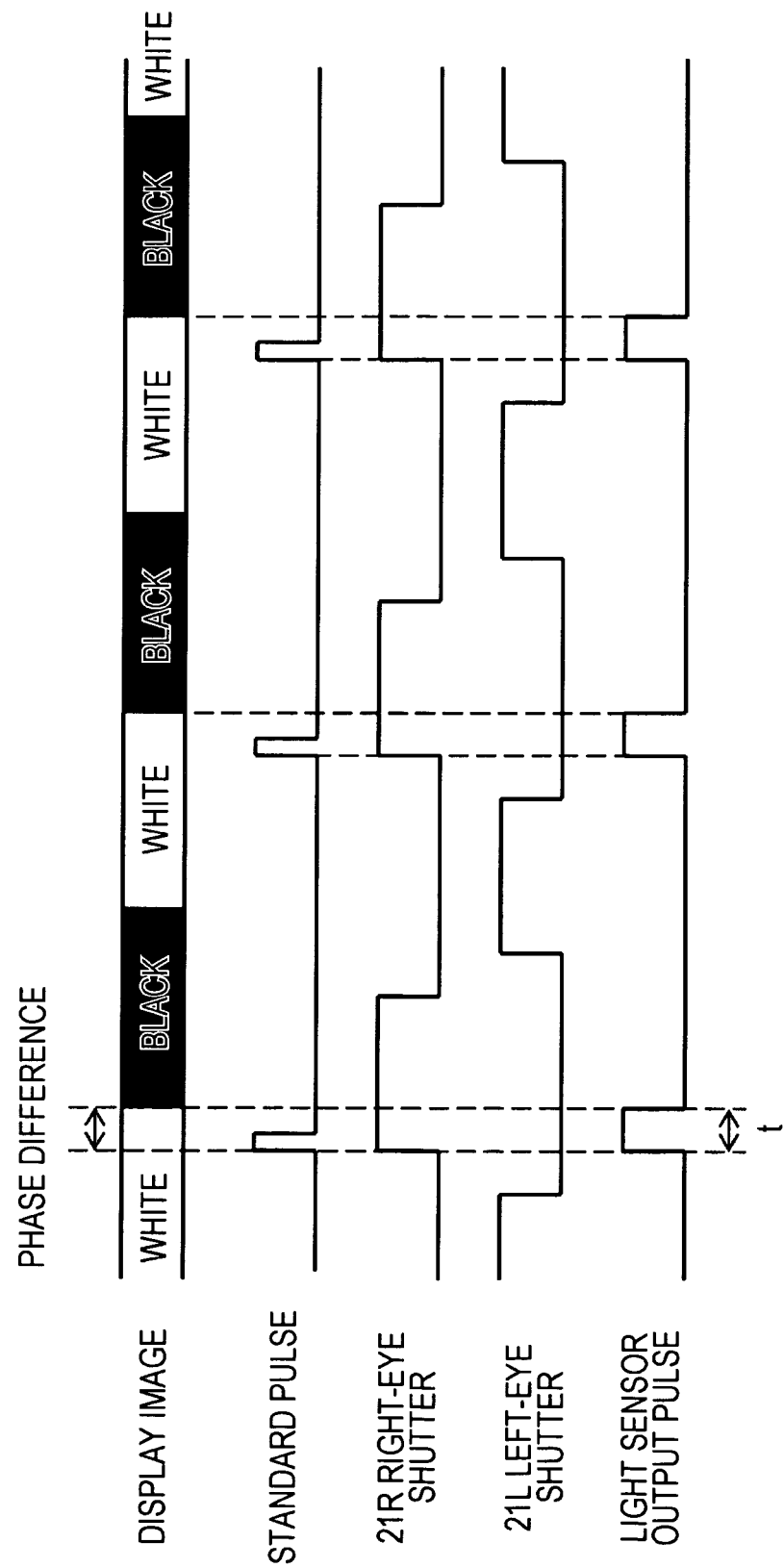
FIG. 6 is a diagram illustrating a timing chart of each section when left and right shutters are operated to open and close by the shutter glasses in accordance with the standard pulse in a state where there is phase difference between the standard pulse and the timing of image switching in the display section.

Additionally, in FIG. 6, a timing chart of each section is shown when the left and right shutters 21L and 21R are operated to open and close by the shutter glasses 20 in accordance with the standard pulse in a state where there is phase difference between the standard pulse and the timing of the image switching in the display section 11.

If there is no phase difference between the standard pulse and the timing of the image switching in the display section 11, in a period when white which is the left-eye image is displayed in the display section 11, since the right-eye shutter 21R is in a closed state, the output of the light sensor 25 should become a non-output state (inactive) as shown in FIG. 4. On the other hand, if there is phase difference between the standard pulse and the timing of the image switching in the display section 11, in a period when white which is the left-eye image is displayed in the display section 11, the right-eye shutter 21R is open. As a result, as shown in FIG. 6, there is a period when the output of the light sensor 25 is in an output state (active), that is, an output pulse.

That there is a period when the output of the light sensor 25 is in an output state means that the frame of the displayed left-eye image is able to be viewed from the opposite right-eye lens. An output pulse width t of the light sensor 25 changes according to the phase difference between the standard pulse and the timing of the image switching in the display section 11. In other words, in the calibration mode, calibration is to make the output pulse width of the light sensor 25 be zero.

Figure 7:
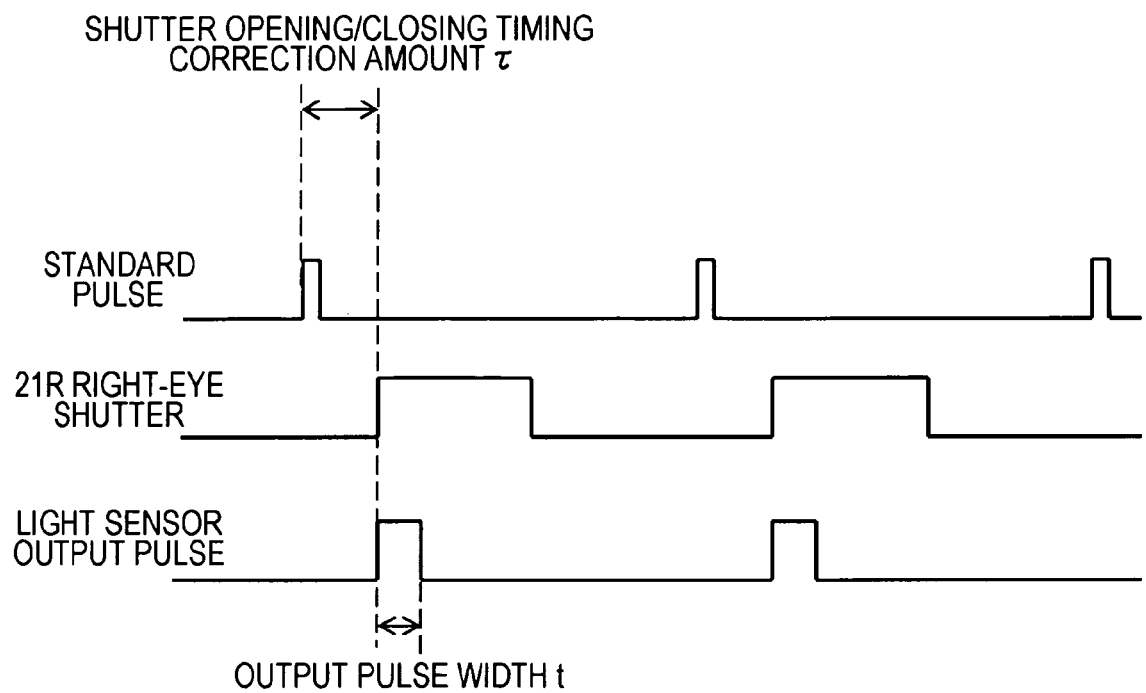
FIG. 7 is a diagram illustrating a correction amount τ [msec] of a timing of opening and closing of the right-eye shutter with regard to the standard pulse and a pulse width t [msec] when output of a light sensor is in an output state.

As shown in FIG. 7, a correction amount of the timing of opening and closing of the right-eye shutter 21R with regard to the standard pulse is set as $\tau$ [msec] and a pulse width when the output of the light sensor 25 is in an output state is set as t [msec]. The processing section 23 searches for an interval of the correction amount $\tau$ where the pulse width t is zero and there is no crosstalk while gradually moving the phase difference from the standard pulse of the timing of the opening and closing of the right-eye shutter 21R. Next, within the interval where there is no crosstalk, the processing section 23 determines the opening period of the shutter. To provide a brighter image to a viewer, it is preferable to set a larger opening period while avoiding crosstalk.

Figure 8:
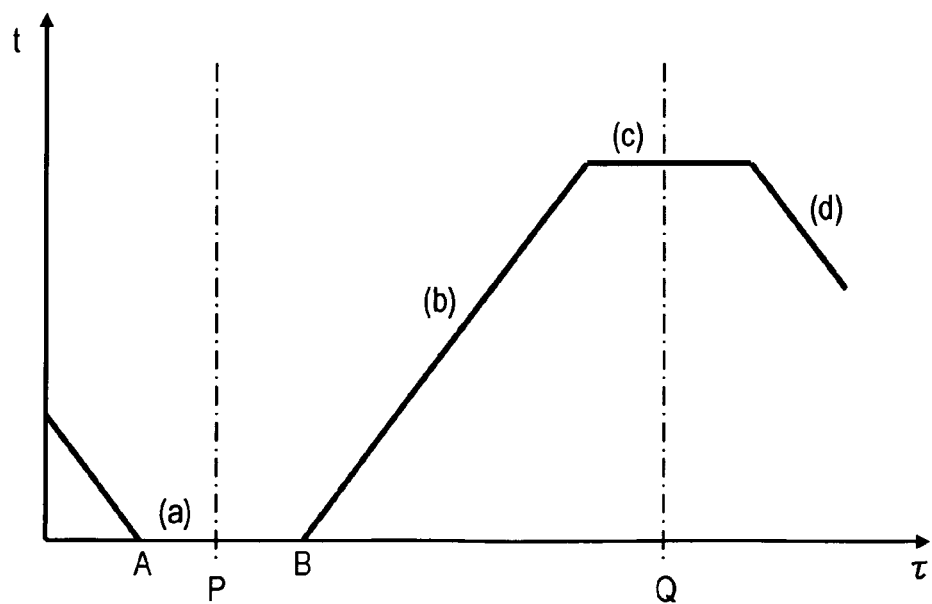
FIG. 8 is a diagram illustrating a relationship (τ-t curve) between the correction amount τ from the standard pulse of the timing of the opening and closing of the right-eye shutter and the output pulse width t of the light sensor.

In FIG. 8, a relationship ($\tau$–t curve) is shown between the correction amount $\tau$ from the standard pulse of the timing of the opening and closing of the right-eye shutter 21R and the output pulse width t of the light sensor 25.

In FIG. 8, the timing correction amount $\tau$ of the right-shutter 21R at a time A when the output pulse width t of the light sensor 25 becomes t=0 from t>0 is set as $\tau A$. After that, as the timing correction amount $\tau$ of the right-shutter 21R becomes gradually larger, the interval ((a) in FIG. 8), where the output pulse width t of the light sensor 25 is zero, continues.

Furthermore, when the timing of the opening and closing of the right-eye shutter 21R reaches the timing of switching to the displaying of white which is the left-eye image in the display section 11, the light sensor 25 detects light being emitted and there is a time B when the output pulse width t becomes t>0 from t=0. The timing correction amount $\tau$ of the right-shutter 21R at the time B is set as $\tau B$.

In the interval ((a) in FIG. 8) when the output pulse width t of the light sensor 25 is zero, crosstalk is avoided. In the embodiment, a timing correction amount $\tau P$ ($=(\tau B-\tau A)/2$) of the right-eye shutter 21R at the center of the interval ((a) in FIG. 8) when the output pulse width t of the light sensor 25 is zero, that is a time P in FIG. 8, is determined as the timing correction amount $\tau$ of the right-eye shutter 21R.

From the time B onwards, since the length of time, where the light sensor 25 detects the display of white which is the left-eye image in the opening period, increases in accordance with an increase in the timing correction amount $\tau$ of the right-eye shutter 21R, an interval ((b) in FIG. 8), when the output pulse width t of the light sensor 25 is increasing, continues.

Furthermore, if the timing correction amount $\tau$ of the right-eye shutter 21R becomes large, the light sensor 25 detects the display of white which is the left-eye image over the entire opening period of the right-eye shutter 21R and the output pulse width t of the light sensor 25 becomes constant at a peak.

The timing correction amount $\tau$ of the right-eye shutter 21R becomes even larger and an interval ((c) in FIG. 8), when the output pulse width t at the light sensor 25 peaks, continues until the timing of the switching to display black which is the right-eye image in the display section 11 is reached. If $\tau$ becomes even larger still, since the length of time, where the light sensor 25 detects the display of white which is the left-eye image in the opening period of the right-eye shutter 21R, decreases, an interval ((d) in FIG. 8), when the output pulse width t of the light sensor 25 is decreasing, continues.

The interval ((c) in FIG. 8), when the output pulse width t at the light sensor 25 is constant at a peak, is when a timing of emitting light where the left-eye image, that is white, is displayed in the display section matches the timing of the opening of the right-eye shutter 21R. The interval ((c) in FIG. 8), when the output pulse width t at the light sensor 25 is constant at a peak, becomes narrower as the duty of the opening period R becomes higher and becomes wider as the duty becomes lower.

Figure 9:
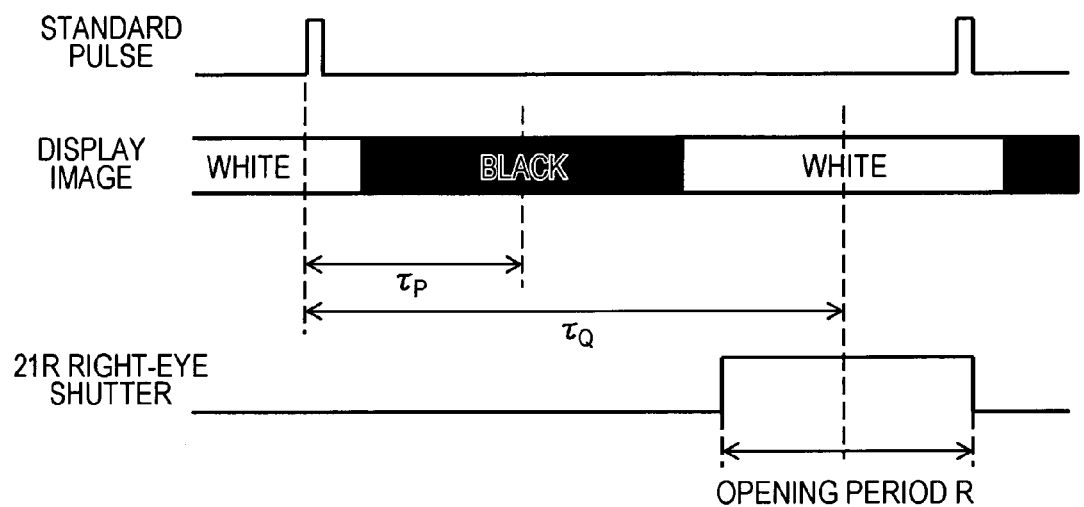
FIG. 9 is a diagram illustrating a timing chart when the timing of the opening and closing of the right-eye shutter is matched to a time Q.

As described above, if the calibration of the timing of the opening of the right-eye shutter 21R and the calibration of the opening time of the right-eye shutter 21R are completed, next, the calibration of the timing of the opening of the left-eye shutter 21L is performed. A timing correction amount τQ of the left-eye shutter 21L is determined as a phase reversal of only 180 degrees from the timing correction amount τP (=(τB−τA)/2) of the right-eye shutter 21R. In FIG. 9, a timing chart is shown when the timing of the opening and closing of the right-eye shutter 21R is matched to a time Q.

Figure 10:
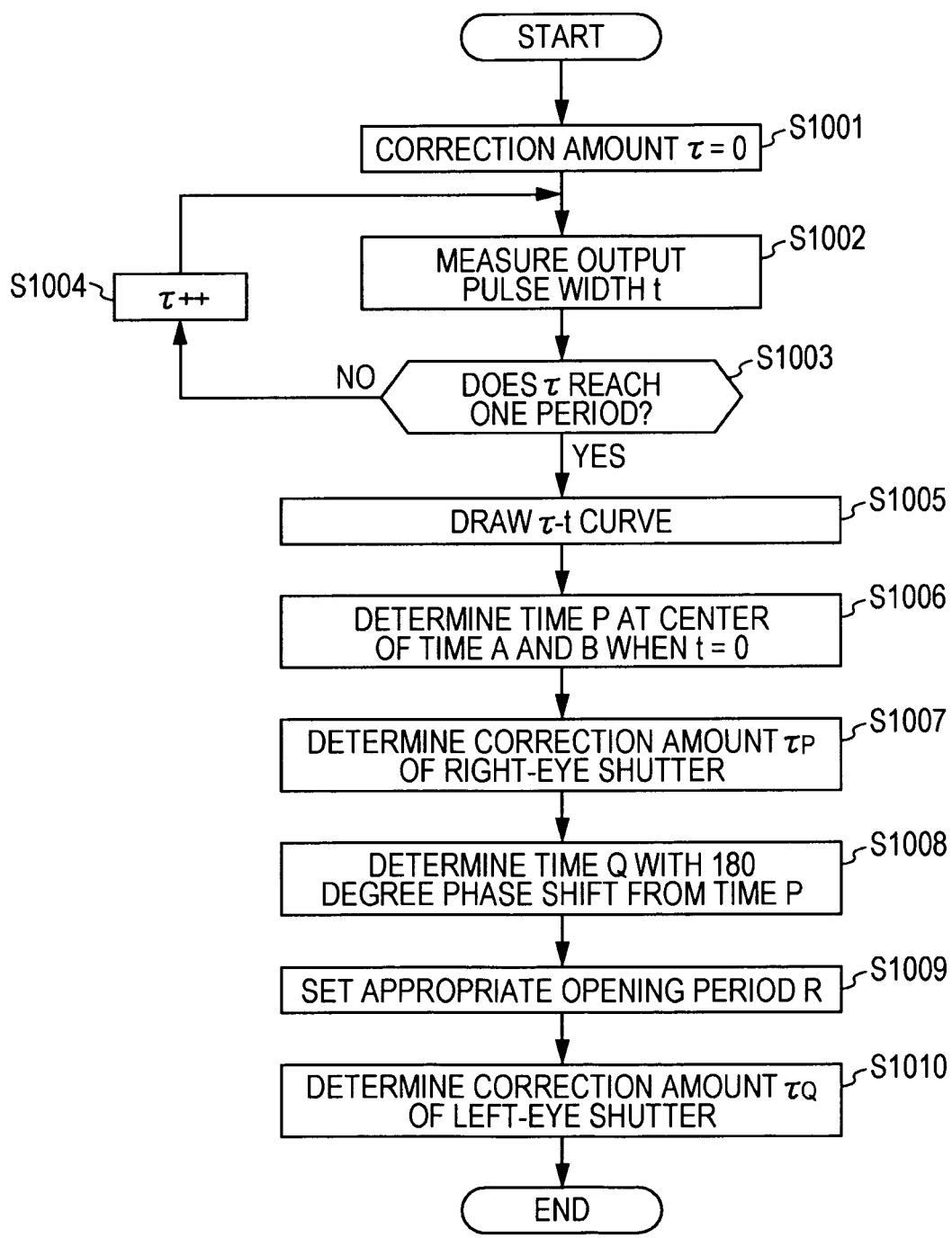
FIG. 10 is a flow chart illustrating a process sequence for performing calibration.

In FIG. 10, a process sequence executed by the processing section 23 for performing calibration is shown in the form of a flow chart.

First, the processing section 23 sets the timing correction amount τ of the right-eye shutter 21R to an initial value of zero (step S1001).

Then, the processing section 23 gradually measures the output pulse width t of the light sensor 25 (step S1002) while incrementally increasing the timing correction amount τ of the right-eye shutter 21R in predetermined amounts (step S1004) in the range until the phase difference reaches one period (No is step S1003). Here, the increment amount per one time in step S1004 is equivalent to a unit of measurement.

In this manner, it is possible to draw a τ–t curve (step S1005) shown in FIG. 8 based on the result of measuring the output pulse width t of the light sensor 25 while changing the timing correction amount τ of the right-eye shutter 21R.

Using the τ–t curve, the time P which is the center of the time A and the time B is determined (step S1006) by obtaining the timing correction amount τA of the right-shutter 21R at the time A when the output pulse width t of the light sensor 25 becomes t=0 from t>0 and the timing correction amount τB of the right-shutter 21R at the time B when the output pulse width t becomes t>0 from t=0.

Then, the timing correction amount τP (=(τB−τA)/2) of the right-shutter 21R is calculated and is determined as the timing correction amount of the right-shutter 21R (step S1007).

In addition, the time Q which is a phase shift of only 180 degrees from the time P is determined (step S1008).

Next, the opening period R of the right-eye shutter 21R is set to an appropriate value (step S1009).

Furthermore, the timing correction amount τQ of the left-eye shutter 21L is determined as a phase reversal of only 180 degrees from the timing correction amount τP (=(τB−τA)/2) of the right-eye shutter 21R (step S1010) and the processing routine is completed.

As above, when the calibration of the opening and closing timing of each of the left and right shutters 21L and 21R of the shutter glasses 20 is completed, it is possible to realize conditions for easy viewing of the screen of the display section 11.

In addition, in the timing chart shown in FIG. 6, it is assumed that the period when white which is the left-eye image is displayed in the display section 11 is normally a light emitting state and that display light is incident on the lens of the shutter glasses 20. In this case, since the output pulse of the light sensor 25, which is the logical conjunction of the display period of the white screen and the period when the right-eye shutter 21R is open, normally expresses a phase difference from the standard pulse of the timing of the image switching, it is sufficient to only measure the output pulse of the light sensor 25 once. That is, it is possible to shorten the calibration time. In regard to this, in a case where the display section 11 is configured by a liquid crystal display, while the liquid crystal panel alternatively portrays a white and a black screen, display light is irradiated while a backlight is driven on and off without being in synchronization with the liquid crystal panel. That is, the display section 11 does not normally emit light in the period when white which is the left-eye image is displayed but emits light only in the period when the backlight is on. As a result, the output pulse of the light sensor 25 becomes a period which is a logical conjunction of the period when the backlight is on out of the display period of the white screen and the period when the right-eye shutter 21R is open, and does not necessarily express the phase difference from the standard pulse of the timing of the image switching.

Figure 11:
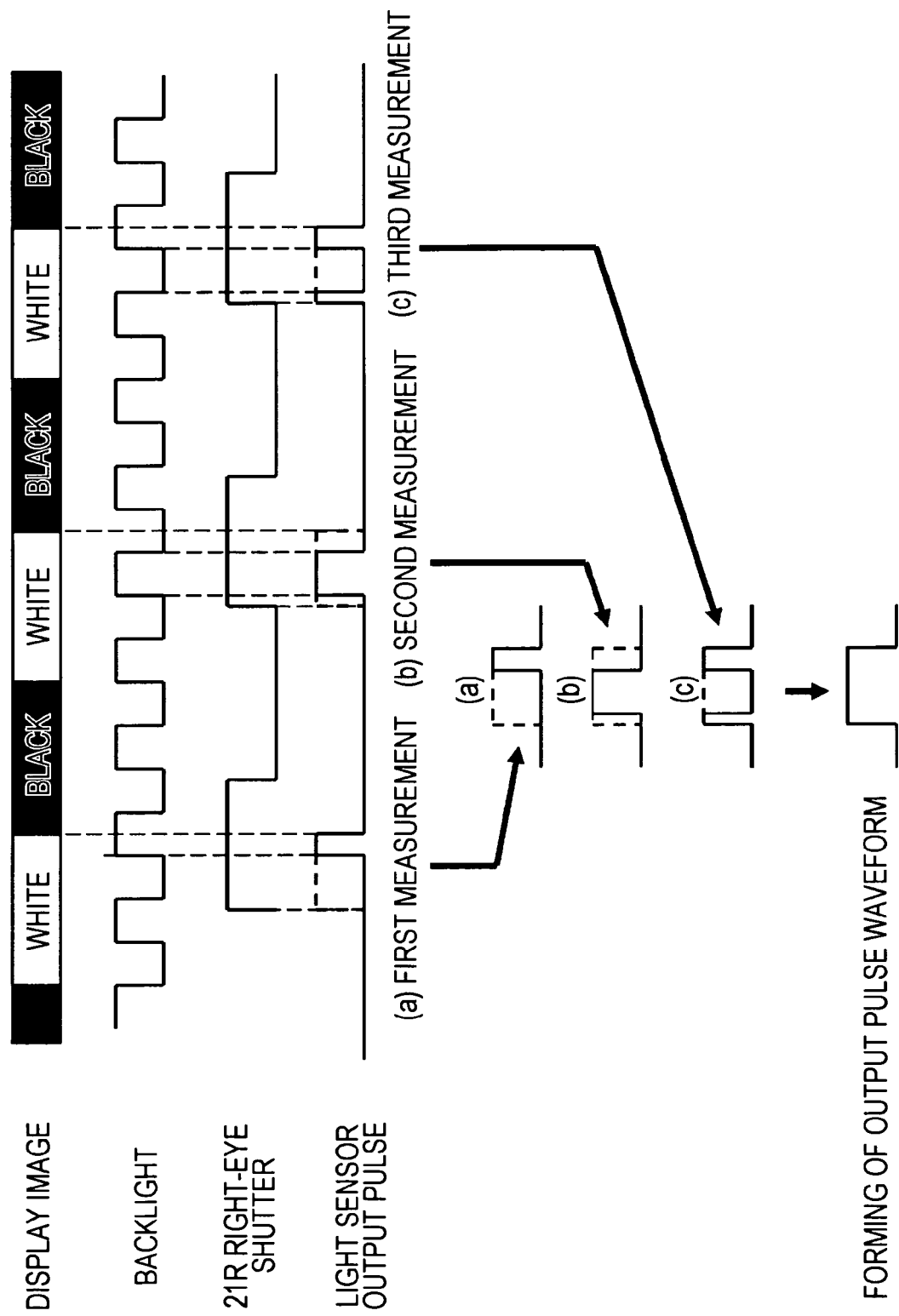
FIG. 11 is a diagram illustrating a timing chart of each section when the output of the light sensor is measured while the left and right shutters are operated to open and close by the shutter glasses in accordance with the standard pulse in a case where the display section is configured by a liquid crystal display.

In FIG. 11, a timing chart of each section is shown when the output of the light sensor 25 is measured while the left and right shutters 21L and 21R are operated to open and close by the shutter glasses 20 in accordance with the standard pulse in a case where the display section 11 is configured by the liquid crystal display. Since the backlight is driven on and off without being in synchronization with the liquid crystal panel, the waveform of the output pulse of the light sensor 25 does not necessarily express the phase difference from the standard pulse of the timing of the image switching. Therefore, it is necessary to form the pulse waveform by taking a longer calibration time, measuring the output pulse of the light sensor 25 a plurality of times, and sampling the output pulses of the maximum time-axis value based on the plurality of measurement results.

As described above, in accordance with the process sequence shown in FIG. 10, it is possible to measure the timing correction amount τ of the opening and closing timing of the shutters for correcting the phase difference from the standard pulse of the timing of the image switching in the display section 11 of the display device 10. It is possible to execute the process sequence shown in FIG. 10 using the processing section 23 in the shutter glasses 20. Alternatively, the output pulse width t of the light sensor 25 may be sent to the display device 10 and it is possible to execute the process sequence shown in FIG. 10 using the display device 10.

The timing correction amount τ of the opening and closing timing of the shutters is a fixed value for each product model of the display device 10 or for each unit. Accordingly, it is not necessary to perform calibration for each of the shutter glasses viewing time-sharing images of the display device 10 and it is sufficient for a plurality of shutter glasses to use the same timing correction amount τ. The timing correction amount τ of the timing of the opening and closing of the shutters, which is obtained by calibration using one set of shutter glasses 20, is held in the display device 10 and the same timing correction amount τ is used by the display device 10 with regard to shutter glasses other than the one set of shutter glasses.

Additionally, two methods of using the obtained timing correction amount τ of the timing of the opening and closing of the shutters are considered. According to a first method, the display device 10 sends the timing correction amount τ of the timing of the opening and closing of the shutters to the shutter glasses 20, and the shutter glasses 20 apply a delay of only the timing correction amount τ with regard to the standard pulse notified by the display device 10 and operate the left and right shutters 21L and 21R to open and close. According to a second method, the display device 10 applies a delay of only the timing correction amount τ with regard to the standard pulse synchronized with the switching of the image signal and notifies the shutter glasses 20 of the standard pulse after correction. According to the second method, it is completely not necessary for the shutter glasses 20 to take into consideration the phase difference from the standard pulse of the timing of the image switching in the display section 11 of the display device 10.

Figure 12:
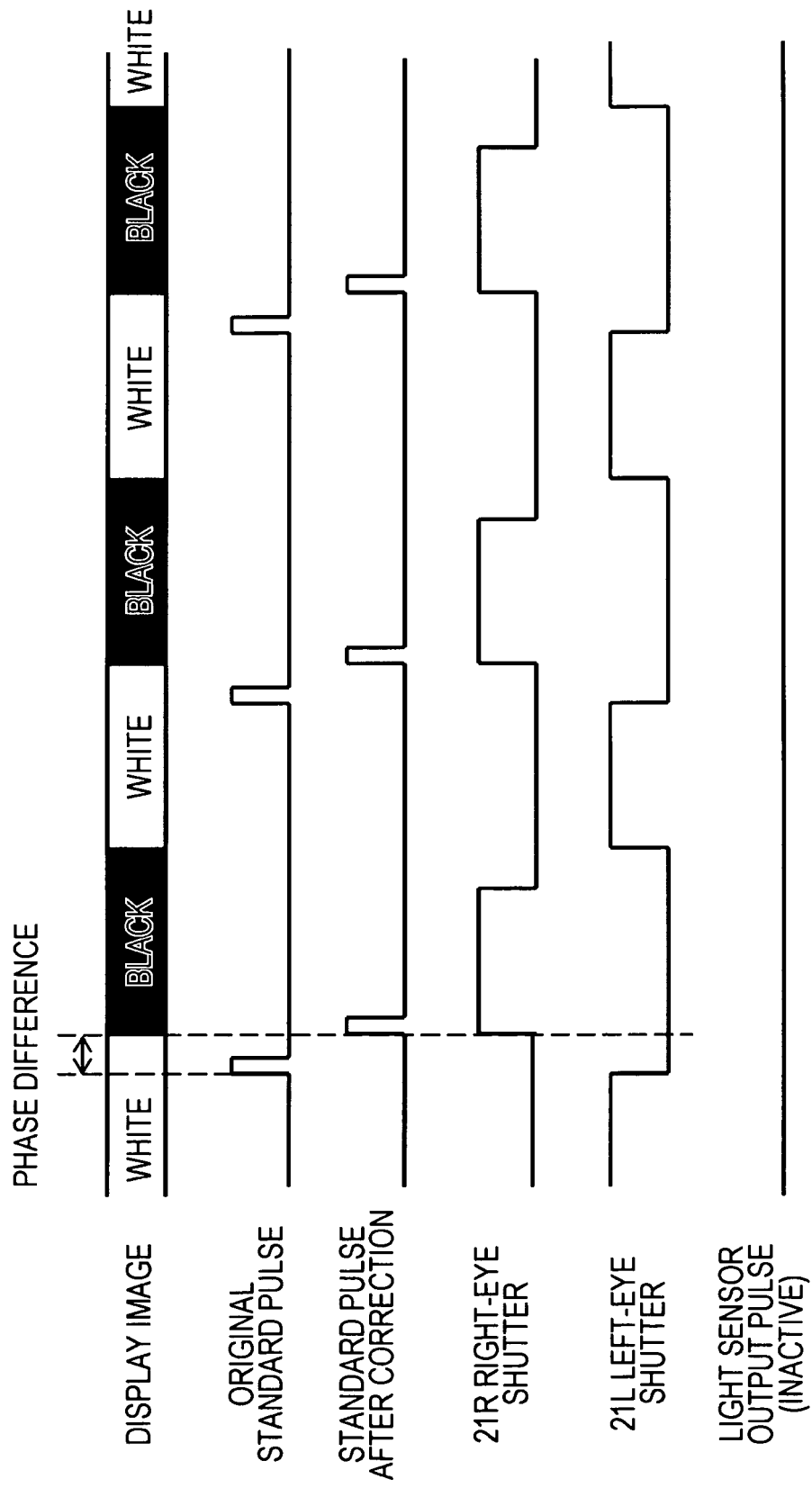
FIG. 12 is a diagram illustrating a timing chart of each section when a display device applies a delay of only the correction amount τ with regard to the standard pulse synchronized with the switching of the image signal and the shutter glasses are operated in accordance with the standard pulse after correction.

In FIG. 12, a timing chart of each section is shown when the display device 10 applies a delay of only the correction amount τ with regard to the standard pulse synchronized with the switching of the image signal and performs correction, and the shutter glasses 20 are operated in accordance with the standard pulse after correction.

Figure 13:
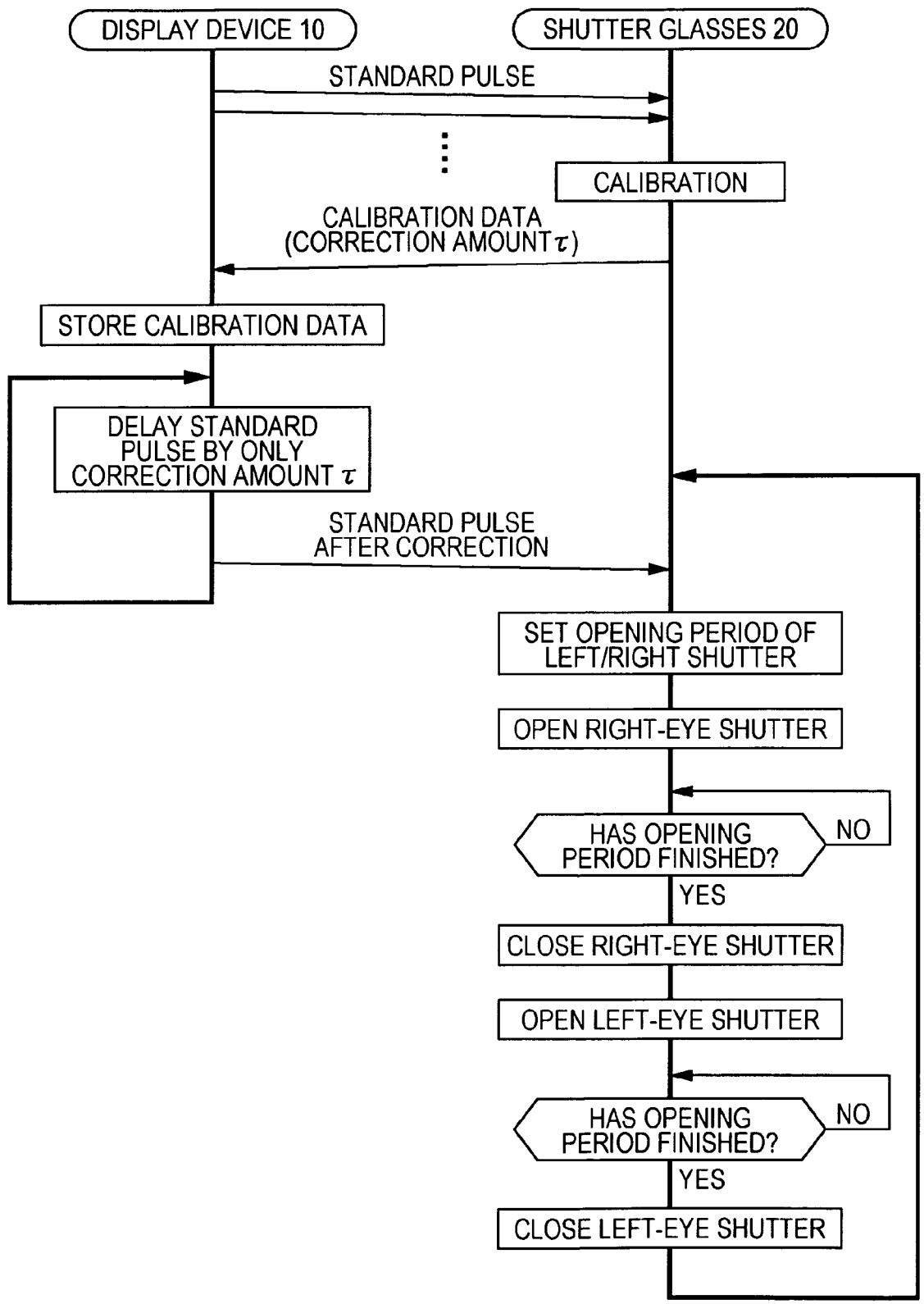
FIG. 13 is a diagram illustrating an operation sequence between the display device and the shutter glasses in a case where the display device sends the standard pulse applied with a delay of the correction amount τ.

Additionally, in FIG. 13, an operation sequence between the display device 10 and the shutter glasses 20 is shown when the display device 10 applies, a delay of only the correction amount τ with regard to the standard pulse synchronized with the switching of the image signal and performs correction, and the shutter glasses 20 are operated in accordance with the standard pulse after correction. Below, the operation sequence will be described.

When performing calibration, while displaying images of black, white, black, white, black, . . . for each frame in the display section 11, the display device 10 sends the standard pulse showing the switching of the image signal to the shutter glasses 20.

In regard to this, the shutter glasses 20 measure the output pulse width t of the light sensor 25 while moving the timing correction amount τ of the timing of the opening and closing of the right-eye shutter 21R and obtains an appropriate correction amount τ of the shutter timing where the output pulse width t of the light sensor 25 is zero, that is, there is no crosstalk. Then, the shutter glasses 20 send the obtained correction amount τ to the display device 10.

The display device 10 stores the received correction amount τ. The correction amount τ of the timing of the opening and closing of the shutters is a fixed value for each product model of the display device 10 or for each unit. After that, when the left-eye image and the right-eye image are alternatively switched and time-sharing stereoscopic images are displayed, the display device 10 applies a delay of only the correction amount τ with regard to the standard pulse synchronized with the switching of the image signal, performs correction, and sends the standard pulse after correction to the shutter glasses.

When the standard pulse is received, the shutter glasses 20 set the opening period R of the left and right shutters 21L and 21R. Then, the right-eye shutter 21R is opened in response to the received standard pulse and the right-eye shutter 21R is closed when the opening period ends. Next, when it is the opening period of the left-eye shutter 21L, the left-eye shutter 21L opens and the left-eye shutter 21L is closed when the opening period ends.

That an appropriate correction amount τP is obtained from the τ–t curve, that is, the relationship of the correction amount τ from the standard pulse of the timing of the opening and closing of the right-eye shutter 21R and the output pulse width t of the light sensor 25, has already been described while referring to FIG. 8.

Here, the time A which is searched for when obtaining the correction amount τP is a timing when the display image of the display section 11 switches from white to black and is equivalent to the lower portion of the screen display when scanning from the top toward the bottom of the screen. Additionally, the time B searched for in the same manner is a timing when the display image of the display section 11 switches from black to white and is equivalent to the upper portion of the screen display.

Figure 14:
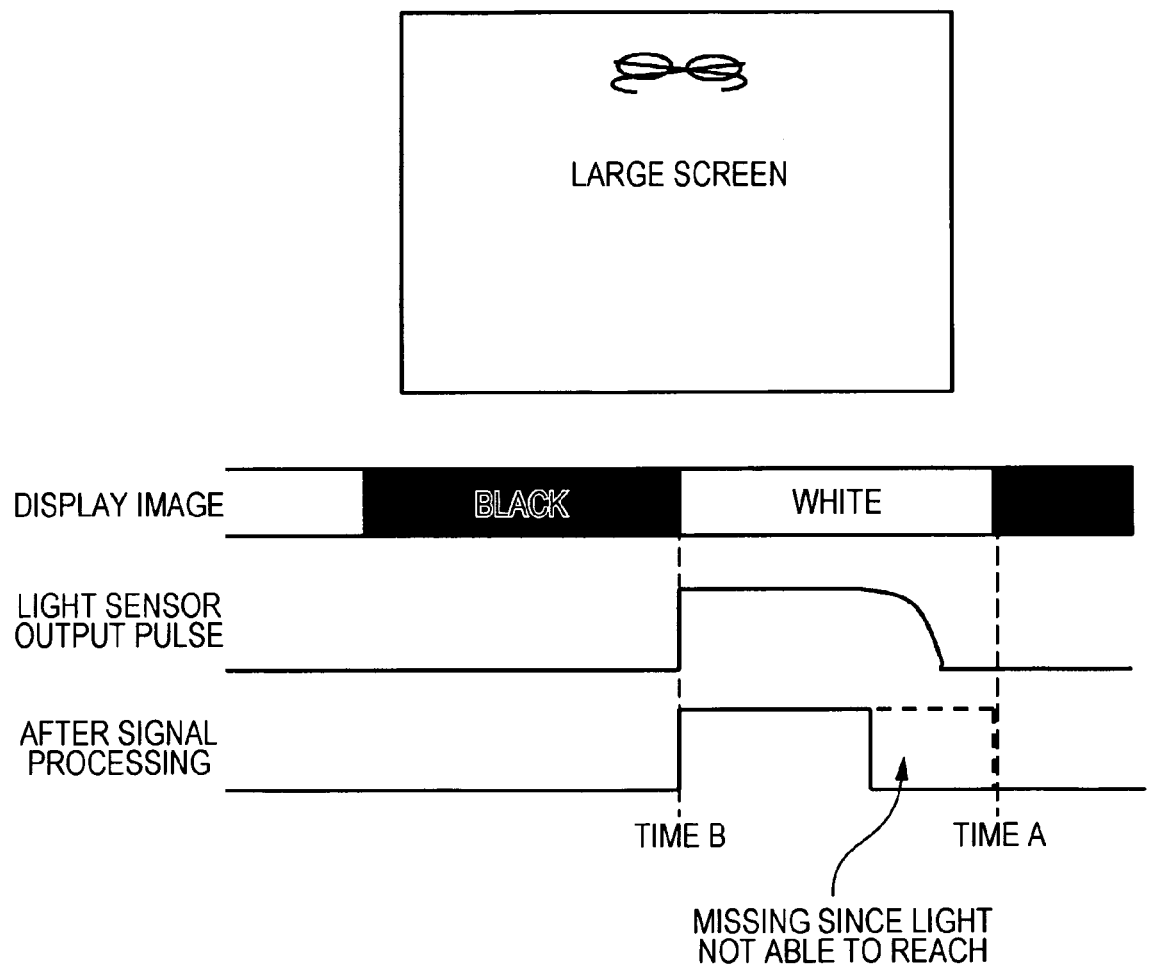
FIG. 14 is a time chart illustrating an image signal and the output pulse of the light sensor when the shutter glasses are positioned in an upper screen portion of the display section with a large screen.

In the case where the display section 11 has a large screen, it is difficult for the shutter glasses 20 in the same location to receive display light from all portions of the screen. For example, in a case where the shutter glasses 20 are positioned in the upper screen portion of the display section 11, the display light, which is from the upper screen portion at a timing when the display image of the display section 11 switches from white to black, sufficiently reaches, but it is difficult for the display light, which is from the lower screen portion at a timing when the display image switches from black to white, to reach. As a result, when the shutter glasses 20 are positioned in the upper screen portion of the display section, it is possible to accurately detect the time A, but since the rear end portion of the output pulse of the light sensor 25 is missing as shown in FIG. 14, the time B is erroneously detected.

Figure 15:
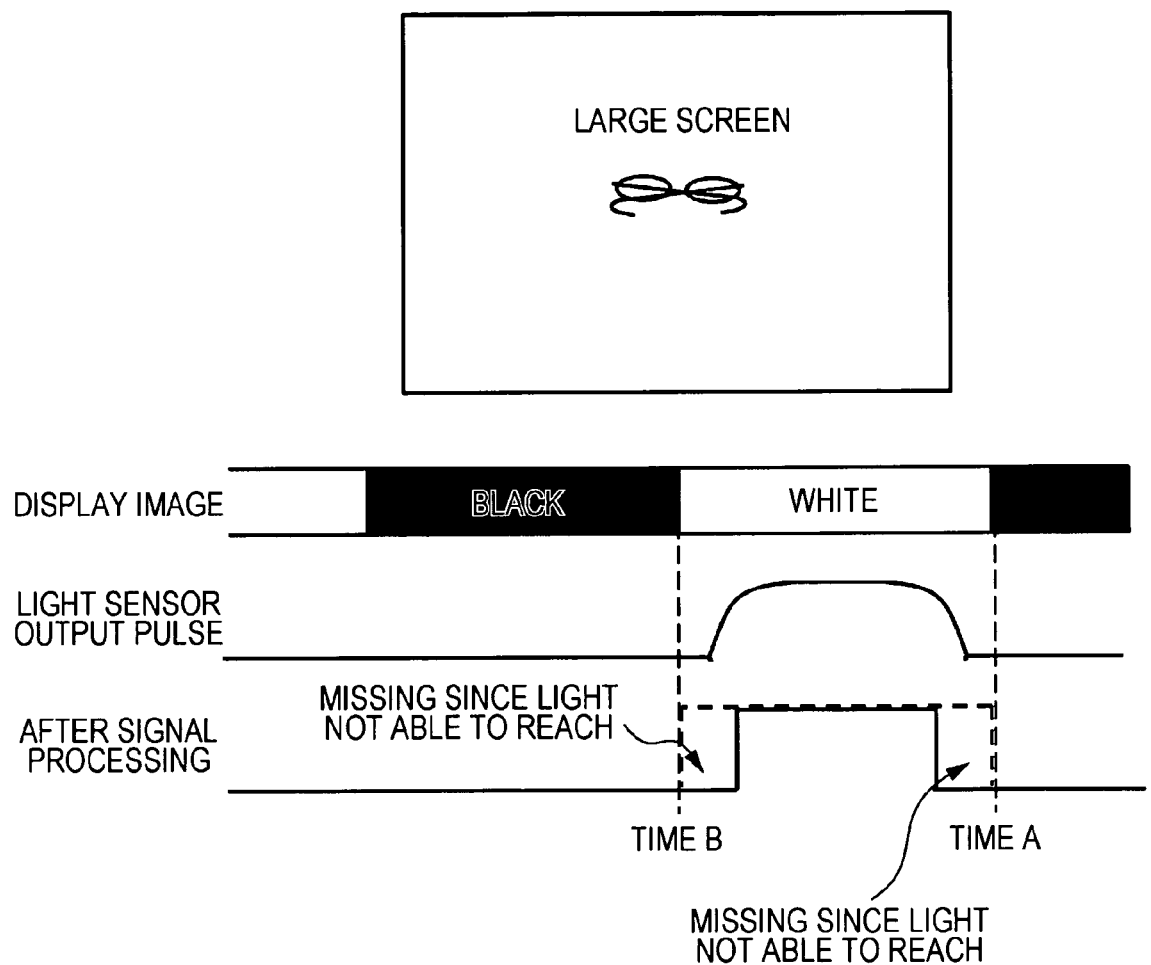
FIG. 15 is a time chart illustrating an image signal and the output pulse of the light sensor when the shutter glasses are positioned in a center screen portion of the display section with a large screen.

Additionally, in the case where the shutter glasses 20 are positioned in the center screen portion of the display section 11, it is difficult for both the display light, which is from the upper screen portion at a timing when the display image of the display section 11 switches from white to black, and the display light, which is from the lower screen portion at a timing when the display image switches from black to white, to reach. As a result, when the shutter glasses 20 are positioned in the center screen portion of the display section, since both the front end portion and the rear end portion of the output pulse of the light sensor 25 are missing as shown in FIG. 15, the time A and the time B are erroneously detected.

Figure 16:
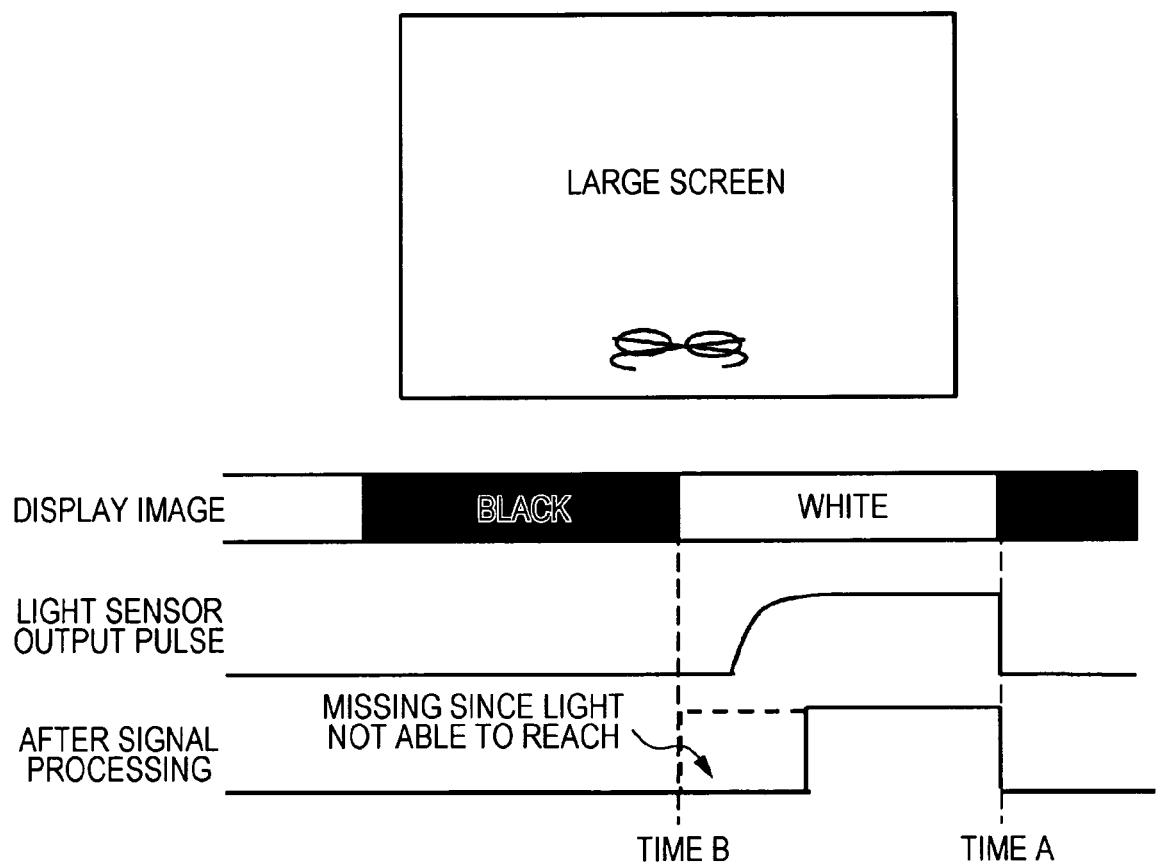
FIG. 16 is a time chart illustrating an image signal and the output pulse of the light sensor when the shutter glasses are positioned in a lower screen portion of the display section with a large screen.

Additionally, in a case where the shutter glasses 20 are positioned in the lower screen portion of the display section 11, the display light, which is from the lower screen portion at a timing when the display image of the display section 11 switches from black to white, sufficiently reaches, but it is difficult for the display light, which is from the upper screen portion at a timing when the display image switches from white to black, to reach. As a result, when the shutter glasses 20 are positioned in the lower screen portion of the display section, it is possible to accurately detect the time B, but since the front end portion of the output pulse of the light sensor 25 is missing as shown in FIG. 16, the time A is erroneously detected.

Therefore, in regard to the display device 10 with the large screen, the inventors proposed a method of performing calibration by positioning the shutter glasses 20 in the upper screen portion and searching for the time B in the τ–t curve, by positioning the shutter glasses 20 in the lower screen portion and searching for the time A in the τ–t curve, and by interpolating using these results.

Figure 17:
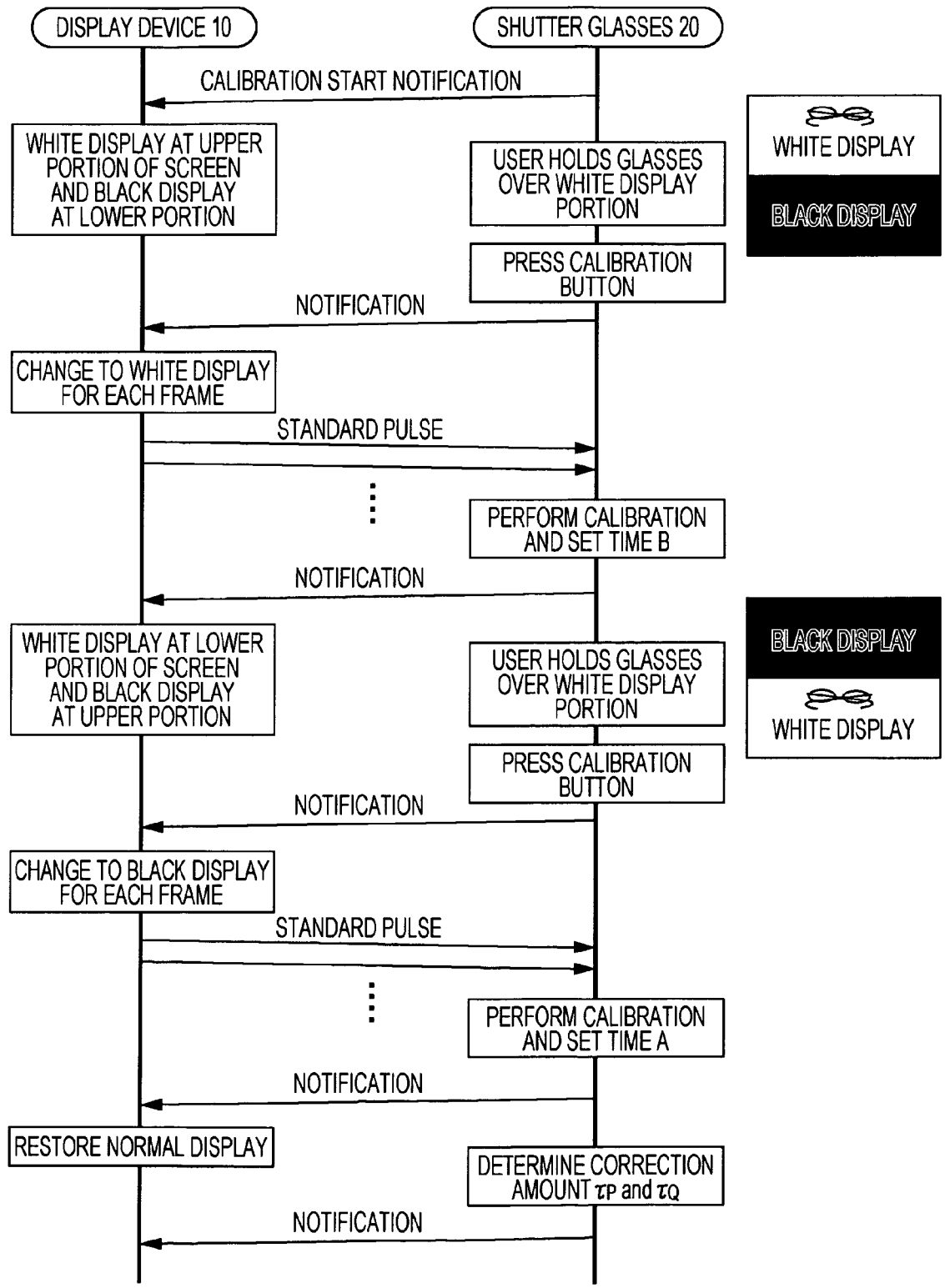
FIG. 17 is a diagram illustrating an operation sequence for performing calibration of the display device with a large screen.

In FIG. 17, an operation sequence is shown for performing calibration of the display device 10 with the large screen by positioning the shutter glasses 20 in the upper screen portion and searching for the time B in the τ–t curve, and by positioning the shutter glasses 20 in the lower screen portion and searching for the time A in the τ–t curve.

Calibration is started in the shutter glasses 20 in response to, for example, a user pressing and operating the calibration button 27. At this time, the shutter glasses 20 notify the starting of the calibration to the display device 10 via the communication section 22.

When the calibration start notification is received, the display device 10 displays white in the region on the screen of the display section 11 where the shutter glasses 20 are positioned and displays black in other regions. Here, in order to detect the time B in the τ–t curve using the upper screen portion, the display device 10 displays white in the upper screen portion of the display section 11.

The user holds the shutter glasses 20 over the upper screen portion of the display section 11, and when the calibration preparation is realized, for example, the calibration button 27 is pressed and operated. Then, the shutter glasses 20 notify the display device 10 that the calibration preparation has been realized via the communication section 22.

When the notification is received, the display device 10 displays images of black, white, black, white, black, . . . for each frame in the display section 11 and notifies the standard pulse synchronized with the switching of the white and black images from the communication section 12.

With regard to this, the shutter glasses 20 operate the right-eye shutter 21R to open and close based on the standard pulse. At this time, while the timing correction amount τ of the right-shutter 21R is gradually increased, the output pulse width t of the light sensor 25, which detects the transmitted light of the right-eye shutter 21R, is measured and the τ–t curve is drawn. Then, when the detection of the correction amount τB of the right-eye shutter 21R at the time B, when the output pulse width t of the light sensor 25 becomes t>0 from t=0, is completed, the display device 10 is notified via the communication section 22.

When the display device 10 receives the notification that the correction amount τB of the right-eye shutter 21R at the time B has been detected, next, in order to detect the time A in the τ–t curve using the lower screen portion of the display section 11, the display device 10 displays white in the lower screen portion of the display section 11.

When the shutter glasses 20 are held over the lower screen portion of the display section 11 and calibration preparation has been realized, for example, the user presses the calibration button 27. Then, the shutter glasses 20 notify the display device 10 that the calibration preparation has been realized via the communication section 22.

When the notification is received, the display device 10 displays images of black, white, black, white, black, . . . for each frame in the display section 11 and notifies the standard pulse synchronized with the switching of the white and black images from the communication section 12.

With regard to this, the shutter glasses 20 operate the right-eye shutter 21R to open and close based on the standard pulse. At this time, while the timing correction amount τ of the right-shutter 21R is gradually increased, the output pulse width t of the light sensor 25, which detects the transmitted light of the right-eye shutter 21R, is measured and the τ–t curve is drawn. Then, the correction amount τA of the right-eye shutter 21R at the time A, when the output pulse width t of the light sensor 25 becomes t=0 from t>0, is detected.

The shutter glasses 20 determine the timing correction amount τP (=(τB−τA)/2) of the right-eye shutter 21R at the time P which is the center of the interval when the output pulse width t (=0) of the light sensor 25 is the timing correction amount τ of the right-eye shutter 21R. Additionally, the timing correction amount τQ of the left-eye shutter 21L is determined as a phase reversal of only 180 degrees from the timing correction amount τP (=(τB−τA)/2) of the right-eye shutter 21R. Then, the shutter glasses 20 notify the display device 10 of the timing correction amount τP of the right-eye shutter 21R and the timing correction amount τQ of the left-eye shutter 21L obtained using calibration via the communication section 22.

When notification of the calibration result is received, the display device 10 stores the calibration result, ends the display of black and white for each frame for calibration, and returns to normal image display.

After that, the display device 10 applies a delay of only the correction amounts τP and τQ with regard to the standard pulse synchronized with the switching of the image signal and notifies the shutter glasses 20 of the standard pulse after correction.

Finally, the mounting method of the light sensor 25 of the shutter glasses 20 will be described.

Figure 18:
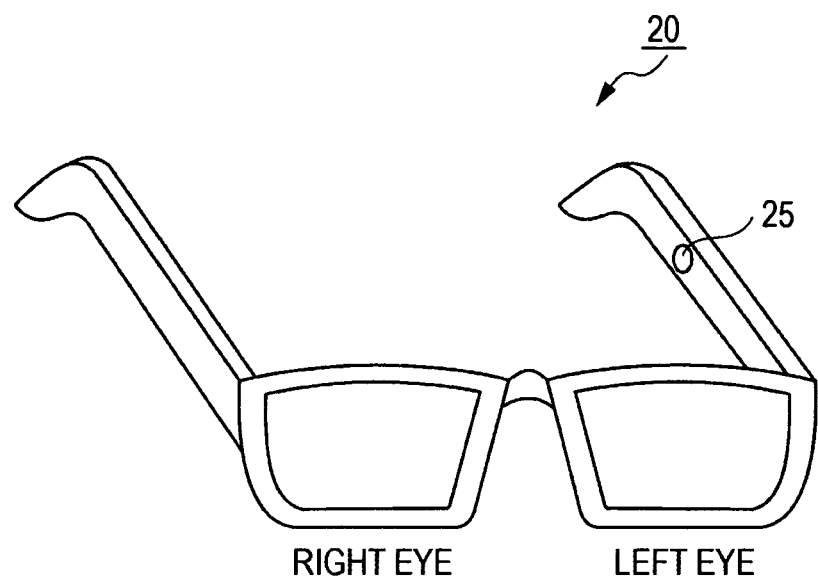
FIG. 18 is a diagram illustrating a configuration example of the shutter glasses where the light sensor is attached to an inner side of a left temple.

The frame of the glasses typical has left and right temples (stems of the glasses) for hanging over the ears, and the temples are supported by a rim which fixes the lenses using hinges and are able to be folded. In FIG. 18, a configuration example of the shutter glasses 20 is shown where the light sensor 25 is attached to an inner side of the left temple. Additionally, in FIG. 19, an appearance of the folded right and left temples of the shutter glasses 20 is shown. As is understood from FIG. 19, by folding the left and right temples, the light sensor 25 attached to the left temple is positioned in a location where it is able to receive transmitted light of the right-eye lens. Accordingly, when performing calibration of the timing of the opening and closing of the shutters, it is sufficient for the user to perform an operation of holding the shutter glasses 20 where the left and right temples have been folded over the screen of the display device 10 which switches the image display of black, white, black, . . . for each frame as shown in FIG. 20.

In FIG. 21, an operation sequence of the user is shown when calibration of the timing of the opening and closing of the shutters is performed in the form of a flow chart.

First, the start of the calibration is notified to the display device 10 by the user pressing and operating the calibration button 27. According to this, the display device outputs image signals of black, white, black, . . . for each frame for calibration from the signal generating unit 13 (step S2101).

Then, in the screen of the display section 11 of the display device 10, images of black, white, black, . . . for each frame are displayed (Step S2102). However, the switching of the images is delayed with regard to the standard pulse.

Figure 19:
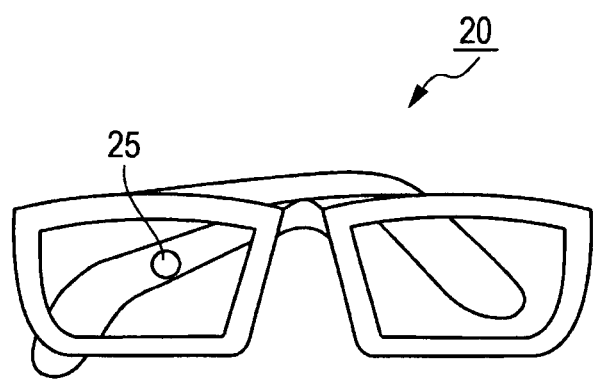
FIG. 19 is a diagram illustrating an appearance of the folded right and left temples of the shutter glasses.
Figure 20:
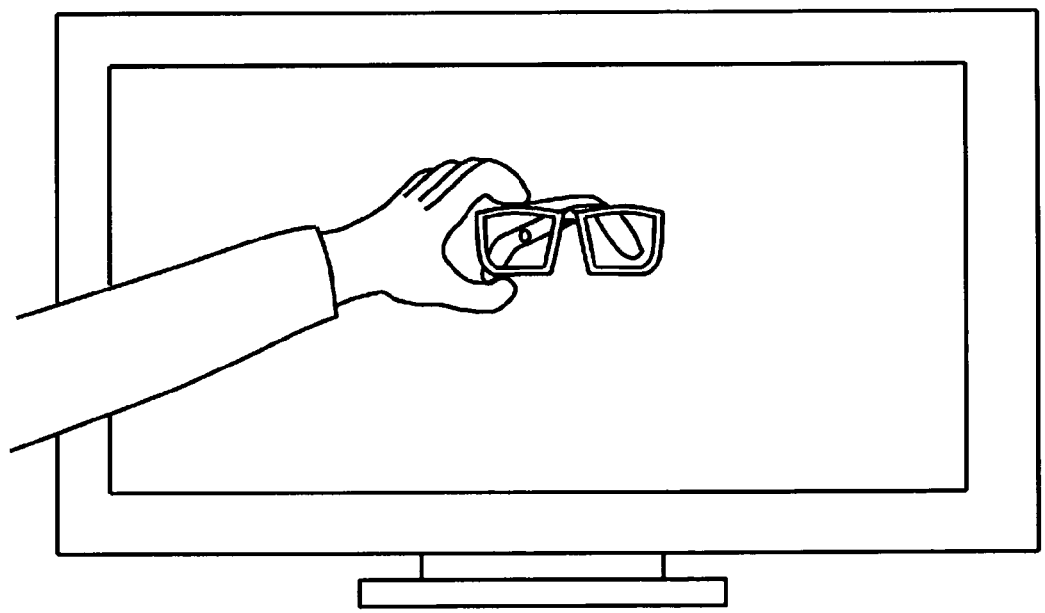
FIG. 20 is a diagram illustrating an appearance of holding the shutter glasses with the right and left temples folded over the screen of the display device and performing calibration of the timing of the opening and closing of the shutters.

Next, as shown in FIG. 19, the user folds the left and right temples of the shutter glasses 20 (Step S2103). Then as shown in FIG. 20, the shutter glasses 20 where the left and right temples have been folded are held over the screen of the display device 10 which switches the image display of black, white, black, . . . for each frame (Step S2104).

When the user presses and operates the calibration button 27, a calibration process is started in the shutter glasses 20 (step S2105). That is, while the timing correction amount τ of the right-shutter 21R is gradually increased, the output pulse width t of the light sensor 25, which detects the transmitted light of the right-eye shutter 21R, is measured and the τ–t curve is drawn. Then, the timing correction amount τP of the right-eye shutter 21R and the timing correction amount τQ of the left-eye shutter 21L are determined based on the τ–t curve.

The user supports the shutter glasses 20 held over the screen of the display device 10 without moving for 1 to 2 seconds while the calibration process is performed (step S2106).

It should be understood by those skilled in the art that various modifications, combinations, sub-combinations and alterations may occur depending on design requirements and other factors insofar as they are within the scope of the appended claims or the equivalents thereof.

What is claimed is:

1. A calibration device comprising:
   a communication section which communicates with a display device which displays images on a screen;
   a light sensor arranged in a position to receive transmitted light of a lens of shutter glasses;
   a signal processing section which processes an output signal of the light sensor;
   a processing section which determines a timing of opening and closing of shutters; and a shutter driving section which operates the opening and closing of shutters of shutter glasses in accordance with the timing of the opening and closing of shutters determined by the processing section, wherein the communication section receives a standard pulse which shows a timing when images are switched from the display device, and the processing section determines an appropriate correction amount τ of the timing of the opening and closing of shutters based on a phase difference between the output signal of the light sensor and the standard pulse.

2. The calibration device according to claim 1, wherein, when the display device alternatively switches between a white display and a black display for each frame, the processing section determines an appropriate correction amount of the timing of the opening and closing of shutters based on a τ–t curve obtained by the lens transmitting display light in a period where a display period of the white screen and an opening period of shutters overlaps, and an output pulse width t which is output from the light sensor being measured while changing the correction amount τ of the timing of the opening and closing of shutters with regard to the standard pulse.

3. The calibration device according to claim 2, wherein the light sensor is arranged in a position to receive transmitted light of a right-eye lens of the shutter glasses, and when the display device alternatively switches between the white display as a left-eye image and the black display as a right-eye image for each frame, in terms of the τ–t curve, a correction amount τA of a time A when the output pulse width t becomes t=0 from t>0 and a correction amount τB of a time B when the output pulse width t becomes t>0 from t=0 are obtained, and based on a time P which is the center between the time A and the time B, a timing correction amount τP (=(τB−τA)/2) of a right-eye shutter and a timing correction amount τQ of a left-eye shutter at a time Q, which is a phase reversal of only 180 degrees from the timing correction amount τP (=(τB−τA)/2) of the right-eye shutter, are determined.

4. The calibration device according to claim 3, wherein the processing section obtains the correction amount τB of the time B when the output pulse width t becomes t>0 from t=0 in a state where the shutter glasses are positioned in an upper screen portion of the display device and obtains the correction amount τA of the time A when the output pulse width t becomes t=0 from t>0 in a state where the shutter glasses are positioned in a lower screen portion of the display device.

5. An image display system comprising:

shutter glasses provided with a shutter for each lens, a light sensor arranged in a position to receive transmitted light of at least one lens, a first communication section, and a control section which controls driving of the shutters; and a display device provided with a display section, a signal generating unit which generates an image signal displayed in the display section, and a second communication section, wherein the display device switches and displays images for each lens in a time sharing manner, and sends a standard pulse which shows a timing of the switching of the images from the second communication section, and the control section of the shutter glasses determines an appropriate correction amount τ of the timing of the opening and closing of the shutters for each lens based on a phase difference between the output signal of the light sensor and the standard pulse received by the first communication section.

6. The image display system according to claim 5, wherein the shutter glasses send information relating to the determined correction amount τ from the first communication section to the display device, and the display device receives and stores the information relating to the correction amount τ sent from the shutter glasses using the second communication section.

7. The image display system according to claim 6, wherein the display device sends the information relating to the stored correction amount τ from the second communication device to the shutter glasses.

8. The image display system according to claim 6, wherein the display device sends the standard pulse after being corrected using the correction amount τ.

9. Shutter glasses comprising:

a lens;

a shutter attached for each lens;

a rim supporting the lens;

a temple attached to the rim so as to be foldable;

a light sensor arranged at an inner side of at least one temple in a folded state so as to receive transmitted light of at least one lens;

a signal processing section which processes an output signal from the light sensor;

a communication section which communicates with a display device which displays images on a screen;

a processing section which determines a timing of opening and closing of the shutters;

a shutter driving section which operates the shutters of the shutter glasses to open and close in accordance with the timing of the opening and closing of the shutters determined by the processing section; and while the temple is folded and the light sensor receives transmitted light of at least one lens, the processing device determines an appropriate correction amount τ of the timing of the opening and closing of the shutters based on a phase difference between the output signal of the light sensor and the standard pulse.

10. The shutter glasses according to claim 9, wherein the communication section receives a standard pulse which shows a timing of the image switching from the display device.

11. The shutter glasses according to claim 10, wherein information relating to the determined correction amount τ is sent from the communication section to the display device.

12. The image display system according to claim 5, wherein the display device is configured to communicate with a plurality of shutter glasses.

13. The image display system according to claim 5, wherein the display device is configured to measure the timing correction amount τ of the opening and closing timing of the shutters for correcting the phase difference from the standard pulse of the timing of the image switching in the display section.

14. The image display system according to claim 7, wherein the shutter glasses apply a delay of the timing correction amount τ with regard to the standard pulse received from the display device and operate the left and right shutters to open and close accordingly.

15. The image display system according to claim 5, wherein the display device applies a delay of the timing correction amount τ with regard to the standard pulse synchronized with the switching of the image signal and notifies the shutter glasses of the standard pulse after correction.

* * * * *